(12) United States Patent
Harada

(10) Patent No.: US 11,651,607 B2
(45) Date of Patent: May 16, 2023

(54) INFORMATION PROCESSING APPARATUS AND NON-TRANSITORY COMPUTER READABLE MEDIUM STORING PROGRAM

(71) Applicant: FUJIFILM Business Innovation Corp., Tokyo (JP)

(72) Inventor: Yushi Harada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 398 days.

(21) Appl. No.: 16/860,019

(22) Filed: Apr. 27, 2020

(65) Prior Publication Data
US 2021/0174078 A1    Jun. 10, 2021

(30) Foreign Application Priority Data

Dec. 5, 2019 (JP) .............................. JP2019-220565

(51) Int. Cl.
*G06V 30/418* (2022.01)
*G06N 20/00* (2019.01)
*G06N 3/08* (2023.01)
*G06V 30/414* (2022.01)
*G06V 30/416* (2022.01)

(52) U.S. Cl.
CPC ............. *G06V 30/418* (2022.01); *G06N 3/08* (2013.01); *G06N 20/00* (2019.01); *G06V 30/414* (2022.01); *G06V 30/416* (2022.01)

(58) Field of Classification Search
None
See application file for complete search history.

(56) References Cited

U.S. PATENT DOCUMENTS

| 2021/0089703 | A1* | 3/2021 | Misawa | G06F 40/56 |
| 2021/0173844 | A1* | 6/2021 | Kobayashi | G06N 5/022 |
| 2021/0174011 | A1* | 6/2021 | Harada | G06F 16/93 |
| 2021/0174013 | A1* | 6/2021 | Harada | G06F 40/194 |

FOREIGN PATENT DOCUMENTS

JP          2010108268       5/2010

* cited by examiner

*Primary Examiner* — Dov Popovici
(74) *Attorney, Agent, or Firm* — JCIPRNET

(57) ABSTRACT

An information processing apparatus includes a processor configured to extract a description including a phrase indicating a relation with a second document element from a first document element, and generate relation information corresponding to information on the description extracted from the first document element, by an AI which has learned, in advance, by machine learning to generate the relation information indicating a relation between the first document element and the second document element from the information on the description.

20 Claims, 18 Drawing Sheets

FIG. 6

| DOCUMENT ID |
| --- |
| DOCUMENT NAME |
| DOCUMENT CHARACTERISTIC |
| CREATOR |
| CREATION DATE AND TIME |
| LAST UPDATER |
| UPDATE DATE AND TIME |
| ACQUISITION DATE AND TIME |
| STORAGE LOCATION |

FIG. 7

| ELEMENT ID |
| --- |
| ELEMENT NAME |
| ELEMENT CONTENT |
| CONTENT CHARACTERISTIC |
| CREATOR |
| CREATION DATE AND TIME |
| LAST UPDATER |
| UPDATE DATE AND TIME |
| ACQUISITION DATE AND TIME |
| STORAGE LOCATION |

FIG. 8

| ELEMENT ID PAIR | SIMILARITY | RELATION TYPE |
|---|---|---|
| (A, B) | 0.1 | - |
| (A, C) | 0.9 | SIMILAR |
| (A, D) | 0.99 | CITATION |
| ..... | ..... | ..... |

…

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2019-220565 filed Dec. 5, 2019.

BACKGROUND

(i) Technical Field

The present invention relates to an information processing apparatus and a non-transitory computer readable medium storing a program.

(ii) Related Art

JP2010-108268A discloses an apparatus that obtains a relation between documents. In the apparatus, a relation-source location extraction unit in a document relation extraction unit selects a document relation extraction rule matching with a document type of a relation source document stored in a relation-source document storage unit, from a document relation extraction rule storage unit. The relation-source location extraction unit extracts a location satisfying a relation-source location extraction condition in the rule, as a relation source location, from the text of the relation source document. A related document search condition generation unit generates a related document search condition from words included in the relation source location, in accordance with the rule. A related document searching unit searches for a related document of which the type matches with a related document type defined in the rule and which satisfies a related document search condition in the rule, among related documents stored in the relation-source document storage unit. The related document searching unit stores a relation between the relation-source document and the related document, in a document relation storage unit of a storage device.

SUMMARY

Determination of whether or not two document elements have a relation, or determination of the type of relation and the like, based on the degree of similarity between contents (for example, text strings) of the document elements is considered.

However, a point that document elements have a relation does not necessarily mean that the contents of the document elements are similar to each other.

Aspects of non-limiting embodiments of the present disclosure relate to an information processing apparatus and a non-transitory computer readable medium storing a program, that, in a case where two document elements have a relation, is capable of obtaining the relation even in a case where the contents of the document elements are not similar to each other.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to extract a description including a phrase indicating a relation with a second document element from a first document element, and generate relation information corresponding to information on the description extracted from the first document element, by an AI which has learned, in advance, by machine learning to generate the relation information indicating a relation between the first document element and the second document element from the information on the description.

BRIEF DESCRIPTION OF THE DRAWINGS

Exemplary embodiment(s) of the present invention will be described in detail based on the following figures, wherein:

FIG. 6 is a diagram illustrating a data structure of a document property in a database;

FIG. 7 is a diagram illustrating a data structure of an element property in the database;

FIG. 8 is a diagram illustrating relation information in the database;

DETAILED DESCRIPTION

Example of Entire System

Figure 1:
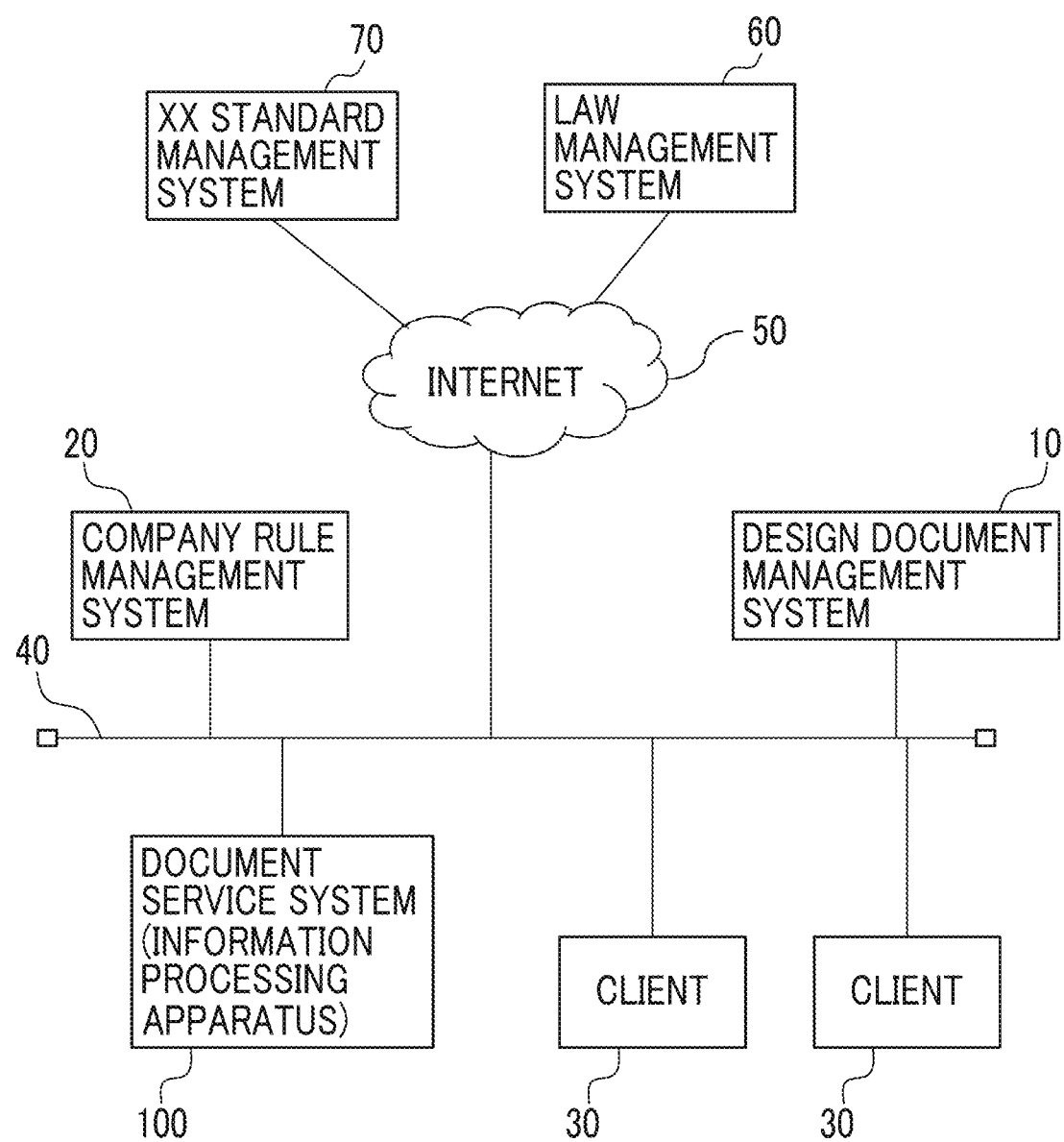
FIG. 1 is a diagram illustrating a configuration of an entire system including a document service system.

FIG. 1 illustrates an entire system for using a document, which includes a document service system 100 being an exemplary embodiment of an information processing apparatus according to an exemplary embodiment of the present invention.

In the example, a document service system 100 is connected to an internal network 40 in a certain company. One or more document management systems for managing various internal documents, such as a design document management system 10 or a company rule management system 20, are connected to the internal network 40. A client 30 such as a personal computer operated by a user is connected to the internal network 40.

Various document management systems such as a law management system 60 and an XX standard management system 70 that manages standard documents of an "XX" technology are provided on the Internet 50. Apparatuses such as the document service system 100 and a client 30 on the internal network 40 are capable of accessing documents of the document management system on the Internet 50.

In a case where one document related to another document in an internal document management system such as the design document management system. 10 is changed, the document service system 100 provides a service (for example, notifying a concerned person of the change) corresponding to the change of the one document for the another document.

Figure 2:
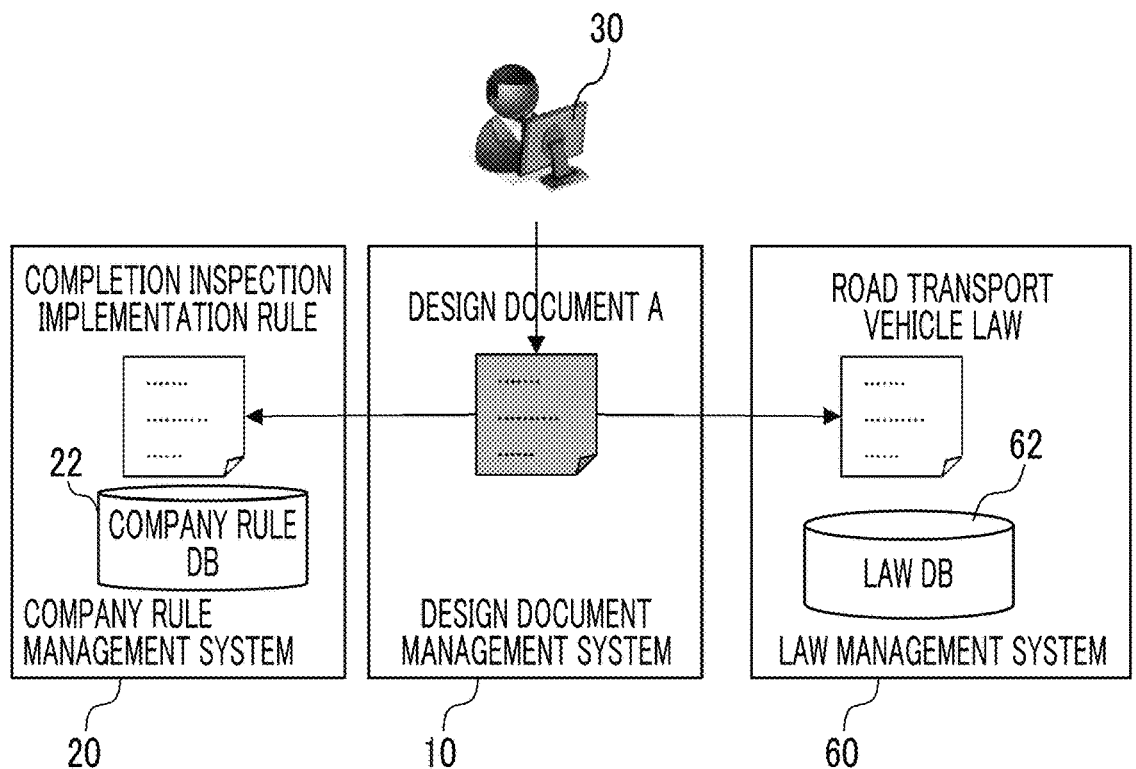
FIG. 2 is a diagram illustrating an example of a document creation operation in the system in FIG. 1.

As illustrated in FIG. 2, a case where a user in a company creates a design document A of a product, registers the created document in the design document management system 10, and maintains the registered document is considered. Since the product is required to be designed to satisfy various laws and various company rules, the design document A is also created with reference to other documents such as the laws and the company rules. For example, the design document A is created with reference to the Road Transport Vehicle Law registered in a law DB 62 of the law management system 60 and a completion inspection implementation rule registered in a company rule DB 22 of the company rule management system 20. The law in the law DB 62 and the rule in the company rule DB 22 are updated at any time in accordance with the revision.

In a case where the Road Transport Vehicle Law and the completion inspection implementation rule are revised, the content of the design document A may be required to be updated, but the update is not always necessary. For example, in a case where the revised part of the law or the like is different from the part on which the content of the design document A depends, the content of the design document A is not required to be updated.

In addition, even though the design document A is created based on a certain part of the law, various methods of depending on the part are provided. For example, there is a case where a section of the law is cited in the design document A by copying the section itself, and there is a case where coincidence of terms between the relevant part of the law and a part of the design document A can be found just by describing the part of the design document A while checking the relevant part of the law. In the former case, necessity to correct the cited part in the design document A by the section of the law being revised is high. On the contrary, in the latter case, the degree of necessity for a response of the design document A to the revision of the relevant part of the law is lower than the degree of necessity in the former case.

Thus, in the exemplary embodiment, the document service system 100 provides a participant of a document, such as a person in charge of managing the design document A, with, for example, a service of supporting an operation of determining whether or not the document is required to be changed in response to a change of another document related to the above document.

Here, the "document" refers to data in any data format, and the data format is not particularly limited. For example, the document may refer to data in a text data format or in various document file formats such as a PDF format. The document may refer to image data in various image data formats or a moving image data. The document may refer to data in a structured document format such as a Hypertext Markup Language (HTML) format or an Extensible Markup Language (XML) format.

In this specification, "a participant" for a document refers to an individual or a user group involved in maintaining the content of the document. The participant may be, for example, a person in charge of maintenance of the content of the document, or may have a role of urging the person in charge to perform the maintenance. For example, a user who has created the document or a user who has updated the document is a representative example of the participant. A document may be configured with a plurality of document elements, and a participant may be set for each document element.

Example of Hardware Configuration

The document service system 100 is implemented by causing a computer to execute a program representing a function of the system.

Figure 3:
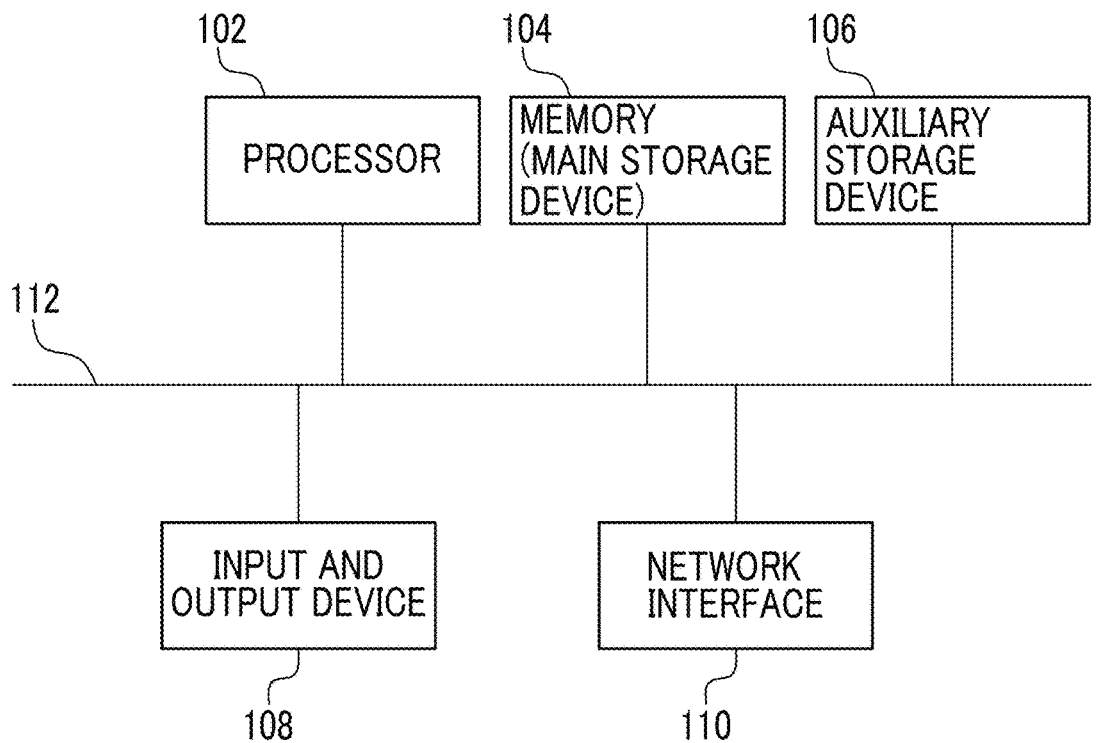
FIG. 3 is a diagram illustrating a hardware configuration of a computer on which the document service system is mounted.

Here, for example, as illustrated in FIG. 3, a computer serving as a base of the document service system 100 has a circuit configuration as follows, as hardware. In the circuit configuration, a processor 102, a memory (main storage device) 104 such as a random access memory (RAM), a controller for controlling an auxiliary storage device 106 such as a flash memory, a solid state drive (SSD), and a hard disk drive (HDD), an interface with various input and output devices 108, and a network interface 110 for controlling a connection with a network such as a local area network are connected to each other via a data transmission path such as a bus 112, for example. A program in which the processing content of each function of the document service system 100 is described is installed on the computer via the network or the like, and is stored in the auxiliary storage device 106. Functions of the document service system 100 are realized by the processor 102 executing the program stored in the auxiliary storage device 106 using the memory 104.

In the embodiments above, the term "processor" 102 refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" 102 is broad enough to encompass one processor 102 or plural processors 102 in collaboration which are located physically apart from each other but may work cooperatively. The order of operations of the processor 102 is not limited to one described in the embodiments above, and may be changed.

Other apparatuses such as the design document management system 10, the company rule management system 20, and the client 30 are also configured using a computer as a base, similar to the document service system 100.

Database Construction

An example of database construction processing used for the document service system 100 providing a service will be described with reference to FIGS. 4 to 8. The database is constructed in the auxiliary storage device 106 in the document service system 100.

Figure 4:
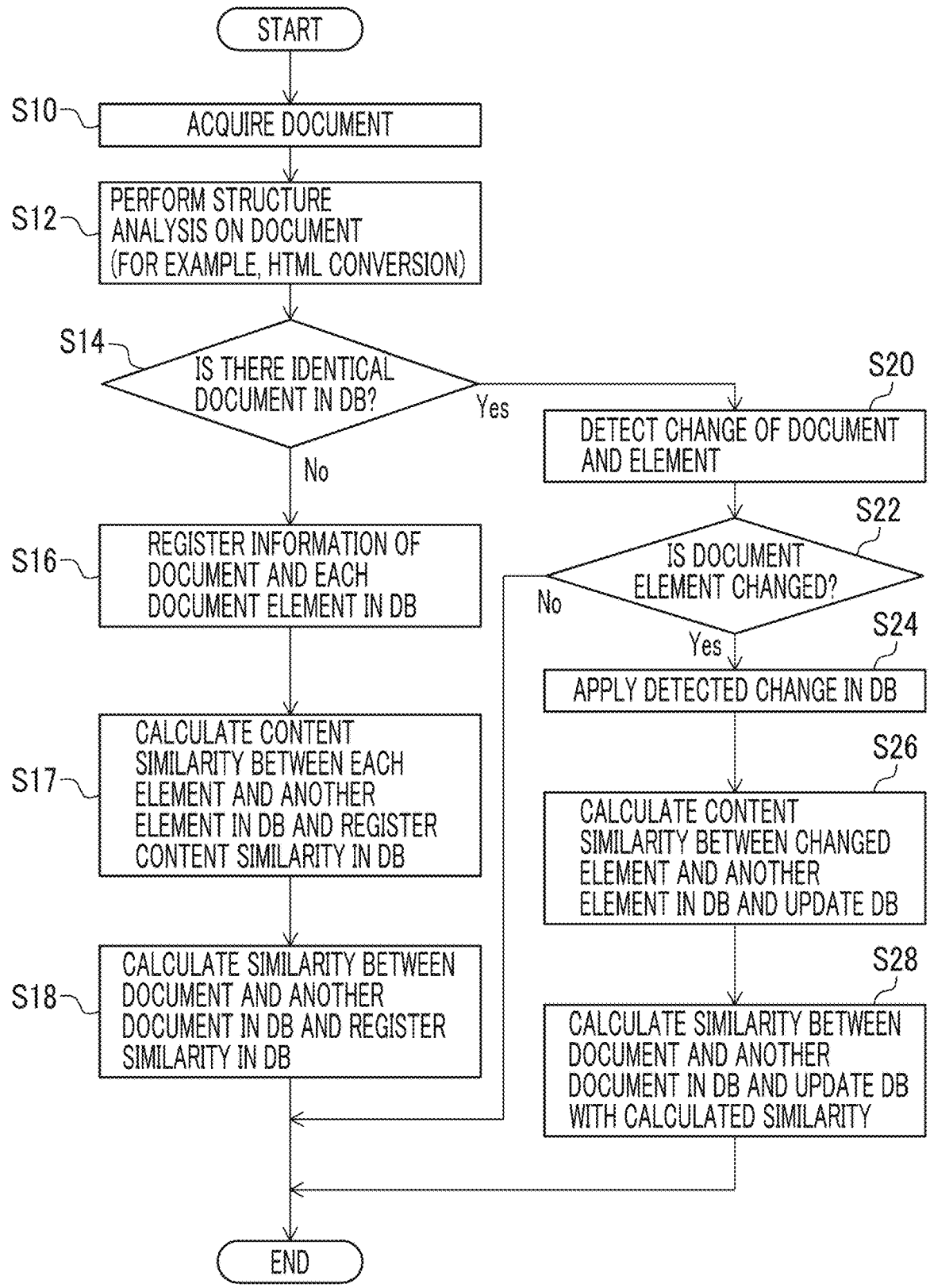
FIG. 4 is a diagram illustrating an example of a database construction and maintenance processing procedure performed by the document service system.

For example, the document service system 100 periodically visits predetermined document management systems inside and outside a company, such as the design document management system 10, the company rule management system 20, and the law management system 60, so as to acquire and analyze a document group registered in the document management systems. In this case, the document service system 100 analyzes information of which a notification is made. A procedure illustrated in FIG. 4 shows a process performed when the document service system 100 acquires one document from any document management system (S10).

In this case, the processor 102 in the document service system 100 analyzes the structure of the acquired document to divide the document into document element units (S12). The structure analysis is performed, for example, by processsing of converting a document into an HTML format. Various tools for HTML conversion are provided. In S12, a tool appropriate for the file format of the document may be used. Alternatively, the structure analysis may be performed using a known technology of recognizing the structure of a heading, a chapter, a section, a paragraph, or the like from the document content. In a case where the acquired document is already a structured document in the XML format or the like, the process of S12 may be omitted.

Then, the processor 102 determines whether or not data of a document identical to the document acquired in S10 is registered in a database (S14). Here, "identical" does not mean that the entire contents of the documents are identical to each other, but that the documents have the identical identification information. The identification information of a document is referred to as a document ID. In S14, whether or not information on a document having a document ID identical to a document ID of the acquired document is in the database is determined.

As the document ID, for example, a combination of identification information of the document management system (for example, company rule management system 20 or law management system 60) as an acquisition source of the document and identification information of the document in the document management system may be used. For example, a uniform resource locator (URL) of the document in the document management system may be used as the document ID of the document.

In a case where the determination result in S14 is No, the document acquired in S10 is a document that the processor 102 firstly encounters. In this case, the processor 102 registers information on the document acquired in S10 and information on each document element obtained by the structure analysis in S12, in the database (S16).

The processor 102 calculates the similarity of the content of each document element with contents of other document elements registered in the database, and registers the obtained similarity in the database for each document element (S17). The similarity of the content between the document elements may be obtained, for example, in a manner that a text string included in the document element is vectorized, and similarity between the obtained vectors of the document elements is calculated by a known method (for example, cosine similarity). As a method of vectorizing the text string of the document element, a known method such as term frequency-inverse document frequency (TF-IDF) or doc2vec may be used.

Here, "the other document element" being a partner for obtaining the similarity with the document element obtained in S12 is typically a document element of another document registered in the database. However, the present invention is not limited to the above method, and the similarity between the document elements obtained in S12 may be further calculated.

The processor 102 calculates the similarity between the document acquired in S10 and another document registered in the database, and registers the similarity of the calculation result in the database (S18). For example, text strings obtained in a manner that text strings of headings of a chapter and a section in the document obtained by the structure analysis in S12 are arranged and merged in order of appearing are set as text strings indicating characteristics of the document, and the text strings are vectorized. The similarity between the vectors of the text strings indicating the characteristics of the documents obtained in this manner is obtained as the similarity between the documents. A method of calculating the similarity between documents is not limited to this. In addition, for example, a tree structure configured with document elements (for example, chapters, sections, and paragraphs) in a document may be set as characteristics of the document, and the similarity between the characteristics may be set as the similarity between documents.

In a case where the determination result in S14 is Yes, data of the document acquired in S10 is registered in the database of the document service system 100. In this case, the processor 102 examines whether or not the document acquired in S10 and each document element obtained in S12 have been changed from the document and document element registered in the database (S20). In this step, for example, for each document element obtained in S12, the processor compares the content of the document element (that is, text string) with the content of the identical document element (that is, document element having the identical identification information) in the database. In a case where both the contents coincide with each other, the processor determines that the document elements are not changed. In a case where both the contents do not coincide with each other, the processor determines that the document elements are changed. A case where the document element identical to the document element obtained in S12 is not in the database or a case where a document element identical to a document element in the database is not provided in the structure analysis result in S12 corresponds to an example of a case where the document element is changed. A case where any one or more document elements are determined to be changed refers to a case where the entire document is changed. A case where there is no document element determined to be changed refers to a case where the entire document is not changed.

The processor 102 determines whether or not the change in the document or the document element has been detected in S20 (S22). In a case where the change has been detected, the processor 102 applies information on the detected change in the database (S24). For example, in a case where the content of a certain document element has been changed, the content of the document element in the database is updated to the content after the change. For a document element of which no change has been detected, the information registered in the database is not required to be changed. In a case where the change of the document element in the document is detected, information such as the update date and time of the document in the database is changed.

The processor 102 calculates the similarity of the content between the document element of which the change of the content has been detected in S20, and another document element in the database. The processor updates the value of the similarity between the document elements, which has been registered in the database, to a value obtained by the calculation (S26). In a case where the document element of which the change of the content has been detected in S20 is a new document element which is not in the database, the processor calculates the similarity between the new document element and another document element in the database, and registers the similarity in the database. In a case where deletion of the document element which has been in the database is detected in S20, information on the similarity between the deleted document element and another document element may be deleted from the database. The process of S26 is not performed on the document element of which the change has not been detected.

The processor 102 calculates the similarity between the document acquired in S10 and another document in the database in a manner similar to that in S18. Then, the processor 102 updates the similarity between this document and another document in the database, in accordance with the calculation result (S28).

An example of information registered in the database in the document service system 100 will be described with reference to FIGS. 5 to 8.

Figure 5:
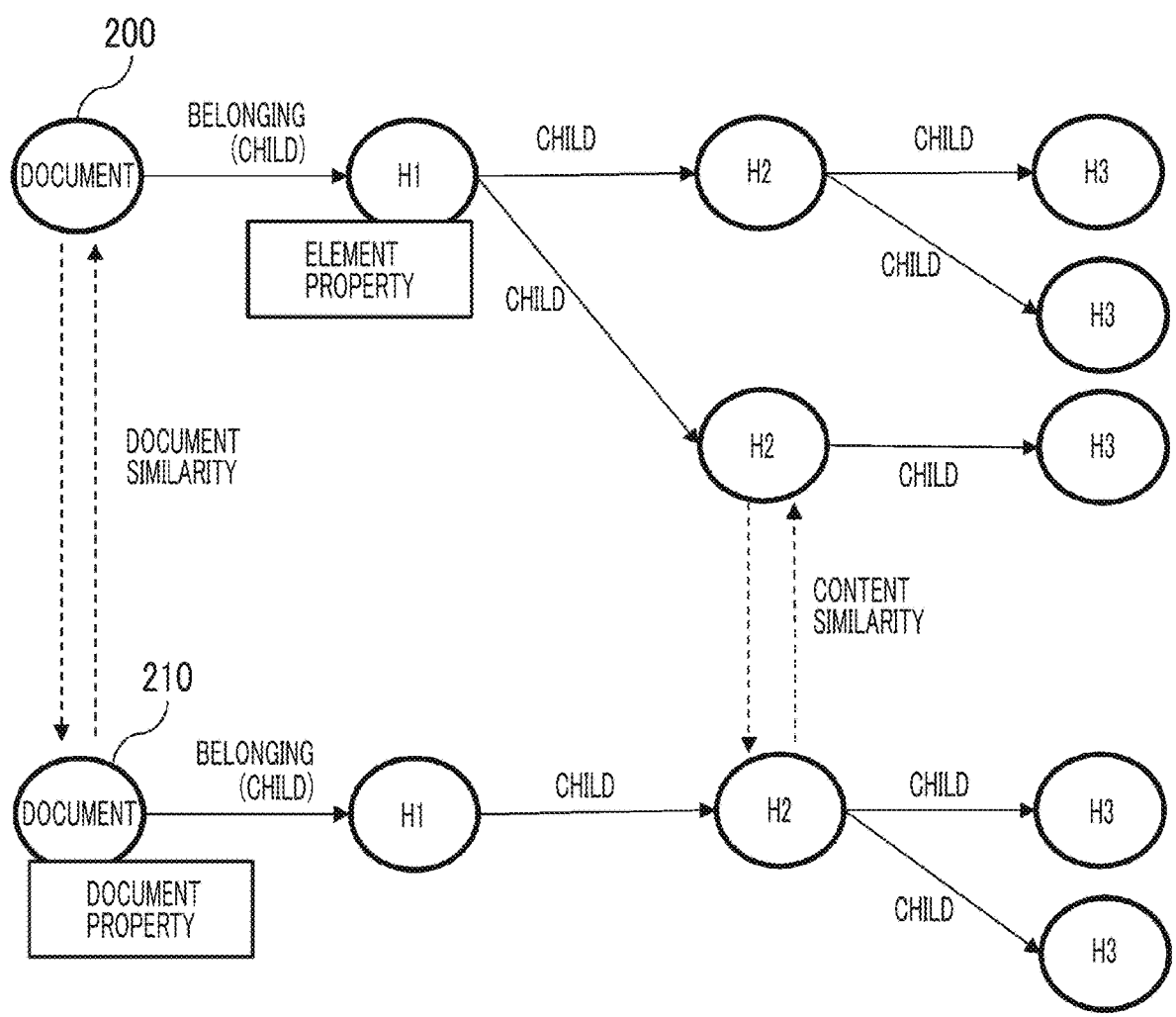
FIG. 5 is a diagram illustrating a structure of a document.

FIG. 5 illustrates information on a structure analysis result of two documents 200 and 210 registered in the database by HTML. The document 200 has an H1 element (for example, title of the document) as a child document element (referred to as a child element below), and the H1 element has two H2 elements as child elements. The H2 elements have two H3 elements and one H3 element, as a child element, respectively. As described above, structure information on the document 200 is represented by a tree structure illustrated in FIG. 5. Unique identification information is assigned to the document and each document element. Data representing the tree structure illustrated in FIG. 5 is registered, as the structure information on the document, in the database in association with the identification information of the document.

Property data (referred to as "document property") for each of the documents 200 and 210 and property data (referred to as "element property") for each document element are registered in the database.

The similarity between the document 200 and the document 210 is calculated and registered in the database. The similarity of the content between the document elements is calculated and registered in the database.

FIG. 6 illustrates an example of a data structure of the document property registered in the database. The document property of the document illustrated in FIG. 6 includes items such as a document ID, a document name, a document characteristic, a creator, the creation date and time, the last updater, the update date and time, the acquisition date and time, and a storage location of the document. The document name is, for example, a filename of the document. The document characteristic refers to data indicating the characteristics of the document. For example, as described above, a text string obtained by arranging and merging text strings of headings of a chapter and a section in the document in order of appearing is provided as an example of the document characteristic. The resultant obtained by vectorizing the text string may be used as the document characteristic. The creator indicates the user ID of a user who has firstly created the document, and the creation date and time indicate the date and time of creation. The last updater indicates the user ID of a user who has updated the document last, and the update date and time indicate the date and time of the update. The types of information on the creator, the creation date and time, the last updater, and the update date and time may be acquired from attribute data of the file of the document, for example. The acquisition date and time indicate the date and time on which the processor 102 has acquired the document last from the document management system such as the company rule management system 20 or the law management system 60. The storage location refers to information of specifying the document management system in which the document has been originally stored (for example, URL of the document management system).

In S18 and S26 in the procedure of FIG. 4 described above, such information on the document property and information on the tree structure of the document obtained in S12 are registered in the database.

FIG. 7 illustrates an example of a data structure of the element property registered in the database. The element property of the document element illustrated in FIG. 7 include items such as an element ID, an element name, an element content, a content characteristic, a creator, the creation date and time, the last updater, the update date and time, the acquisition date and time, and a storage location of the document element. The element ID refers to identification information of the document element. For example, a set of a document ID of a document including the document element and a number uniquely assigned to the document element in the document may be used as the element ID. The element name refers to the name of the document element. For example, in a case where the document element includes a heading, the heading may be used as the element name. In a case where the document element does not include the heading, a text string having a predetermined number of characters at the head of the document element may be used as the element name. The element content refers to data of the content of the document element. For example, in a case where the document element is a text, the element content is a text string of the text. The element characteristic refers to data indicating the characteristic of the document element, and is obtained by vectorizing the text string of the document element described above, for example. The creator indicates the user ID of a user who has firstly created the document, and the creation date and time indicate the date and time of creation. In a case where the original document file (or the document management system that manages the original document file) has information on the creator or the creation date and time for each document element, the information is registered in the item of the creator or the creation date and time in the element property. In a normal case where the file of the original document has only the creator and the creation date and time in a document unit, the creator and the creation date and time of the document are registered in the creator and the creation date and time of the document element included in the document in the element property.

The last updater indicates the user ID of a user who has updated the document element last, and the update date and time indicate the date and time of the update. In a case where the original document file (or the document management system that manages the original document file) has information on the last updater or the update date and time for each document element, the information is registered in the item of the last updater or the update date and time in the element property. In a normal case where the file of the original document has only the last updater and the update date and time in a document unit, values of the last updater and the update date and time of the document when the change of the content of the document element is detected are registered in the items of the last updater and the update date and time of the document element included in the document in the element property. Whether or not the content of the document element has been changed is determined by comparing the element content or the content characteristic of the document element obtained in S12 with the element content or the content characteristic of the document element in the database having the identical element ID.

The acquisition date and time refers to the date and time on which the processor 102 has acquired the document element last. The acquisition date and time is identical to the acquisition date and time of the document including the document element. The storage location refers to information of specifying the document management system in which the document element has been originally stored, and is identical to the storage location of the document including the document element.

In S16 of the procedure of FIG. 4 described above, information on each item of such element property is registered in the database. In S24, the processor updates the value of each item of the element property of the document element of which the change has been detected, to a value corresponding to the content of the change.

In a case where the document is acquired from an external document management system (for example, document management system outside the internal network 40), acquiring information on all items of the document property and the element property illustrated in FIGS. 6 and 7 for the above document may not be possible. Such an item is set to a null value, or a value obtained by the document service system 100 based on another type of information is set. For example, for a document acquired from the law management system 60, difficulty in obtaining information on the creator, the creation date and time, the last updater, and the update date and time from the document or the law management system 60 is considered. In this case, the items of the creator, the creation date and time, and the last updater may be set to null values. In a case where the change of the document element in the acquired document has been detected in S20 of the procedure in FIG. 4, the document service system 100 may set the date and time of the acquisition to the update date and time of the document element and the document.

The item group of the document property and the element property illustrated in FIGS. 6 and 7 are only examples. The document property and the element property are not required to include all of the illustrated items, and may include items that are not illustrated.

FIG. 8 illustrates relation information between document elements registered in the database. The relation information illustrated in FIG. 8 is associated with a pair of element IDs of two document elements. The relation information includes a value of the similarity of the content between the two document elements and the type of relation between the document elements, which is determined from the value. In the example, the types of relation between document elements are classified into several types in accordance with the magnitude of the similarity of the content between the document elements. For example, in a case where the similarity of the content between the document elements is equal to or greater than 0.95 (that is, 95%), the type of relation between the document elements is named "citation". The type of relation in a case where the similarity of the content between the document elements is equal to or greater than 0.80 and smaller than 0.95 is named "similar". In a case where the similarity is equal to or greater than 0.60 and smaller than 0.80, the type of relation is named "reference". Ina case where the similarity is smaller than 0.60, the two document elements are determined to be unrelated.

Although not illustrated in FIG. 8, the date and time on which the similarity or the type of relation is determined may be further registered in the relation information.

In S17 and S26 in the procedure of FIG. 4, the similarity between the document elements and the type of the relation corresponding to the similarity are determined, and the values are registered in the relation information illustrated in FIG. 8.

The relation information illustrated in FIG. 8 is merely an example. As the relation information, information that includes similarity but does not include the type of relation may be used, and conversely, information that does not include similarity but includes the type of relation may be used.

Services Provided by Document Service System

An example of a service provided by the document service system 100 using the constructed database will be described.

Figure 9:
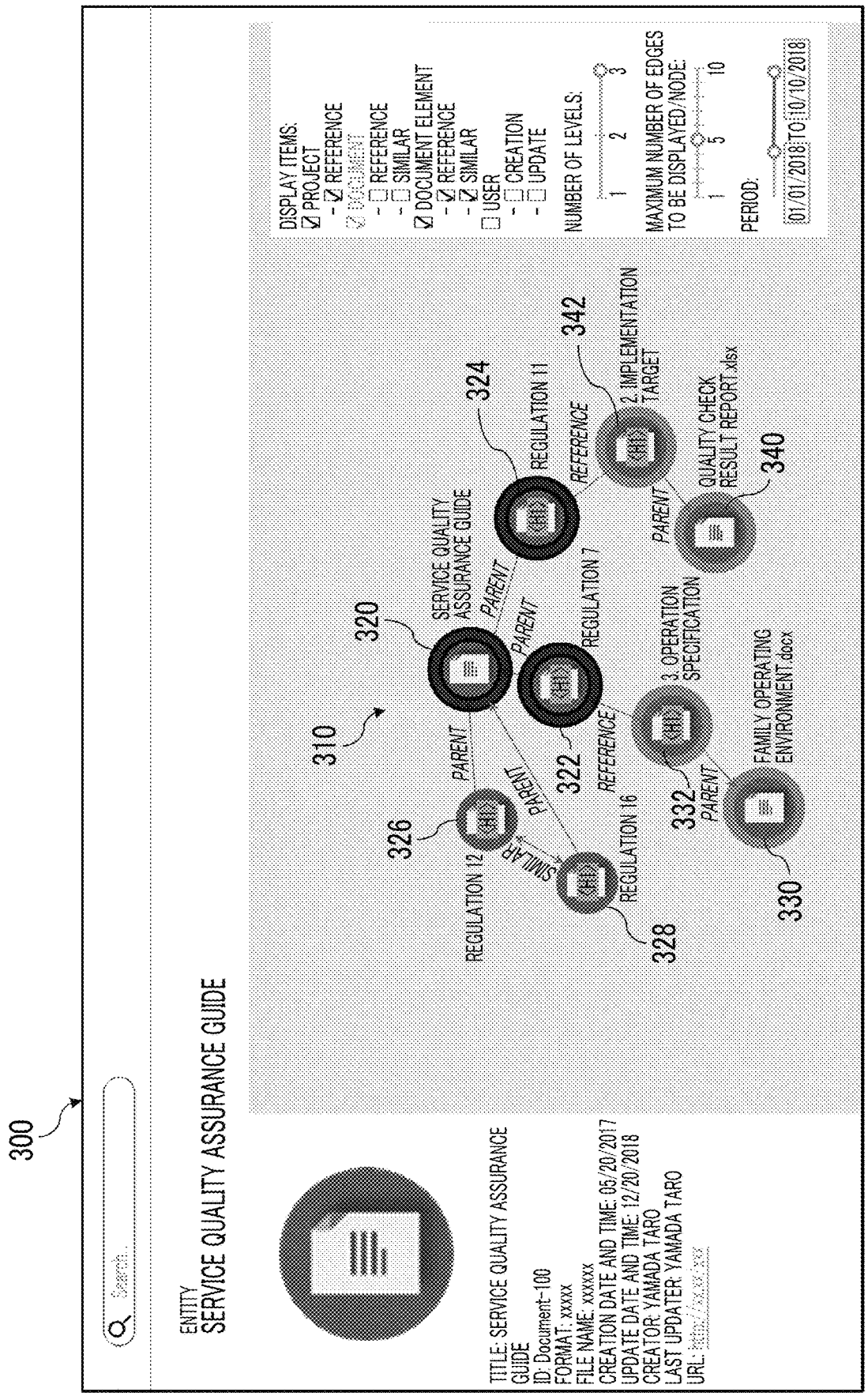
FIG. 9 is a diagram illustrating an example of an information providing screen provided by the document service system.

FIG. 9 illustrates an information providing screen 300 provided by the document service system 100 to the user. The information providing screen 300 provides information on document elements 332 and 342 related to changed document elements 322 and 324 among documents 320 designated by a user. The information is provided in a form of a graph 310 of a relation between the document 320 and the document elements 322, 324, 332, and 342.

All document elements related to the changed document elements 322 and 324 are not displayed on the information providing screen 300, but only a document element of which the user is a participant (for example, person who has created or updated the document element) is displayed. For the document element of which the user is a participant, the user is expected to perform a change operation in response to the change of the document elements 322 and 324. Thus, the user is provided with the information on the document element. On the contrary, for the document element of which the user is not the participant, a possibility that the user does not perform a corresponding operation such as correction even though the information is provided to the user is high. Thus, providing the information is not performed.

Here, an example in which a creator or an updater included in the element property of the document element is provided as the participant of the document element is described. In addition, a user or a user group having an edit authority for the document element or a document including the document element may be set as the participant of the document element.

In the example illustrated in FIG. 9, a document designated by the user is a document having a document name of "service quality assurance guide". In the document, a document element 322 having an element name of "Regulation 7" and a document element 324 having an element name of "Regulation 11" are detected as the changed document elements. Whether or not the document element has been changed may be determined based on, for example, whether or not the document element is updated within a period that goes back by a predetermined length (for example, one month) from the current time. That is, in a case where the last update date and time of the document element is within the period, "the document element has been changed" is determined. In a case where the last update date and time is before the period, "the document element has not been changed" is determined. The length of the period may be designated by the user. The user may be able to designate both the start and end of the period. A designation field of "period" at the lower right portion of the information providing screen 300 is used for designation of the user.

In the example illustrated in FIG. 9, a document element 332 having a relation of "reference" to the changed document element 322 is provided. The document element 332 is a document element belonging to a document 330 having a document name of "family operating environment.docx" and has an element name of "3. operation specification". A document element 342 having a relation of "reference" to the changed document element 324 is provided. The document element 342 is a document element belonging to a document 340 having a document name of "quality check result report.xlsx" and has an element name of "2. implementation target".

In the example illustrated in FIG. 9, document elements 326 and 328 having a relation of "similar" to each other are shown in a document element group of the document 320.

The graph 310 shows a node group indicating the documents 320, 330, and 340, a node group indicating document elements 322 to 328, 332, and 342, and an edge group indicating a relation between the nodes. A text string indicating the type of relation indicated by an edge is displayed near each edge. For example, a text string of "reference" is shown at an edge indicating the relation between the document elements 322 and 332. A text string of "similar" is shown at an edge indicating the relation between the document elements 326 and 328. For example, a text string of "parent" is shown at an arrow-like edge extending from the document element 322 to the document 320. This indicates that the document 320 is a parent in the tree structure as viewed from the document element 322.

In the graph 310, the nodes of the changed document 320 and the changed document elements 322 and 324 are highlighted in a special display form indicating that the change has been performed.

Figure 13:
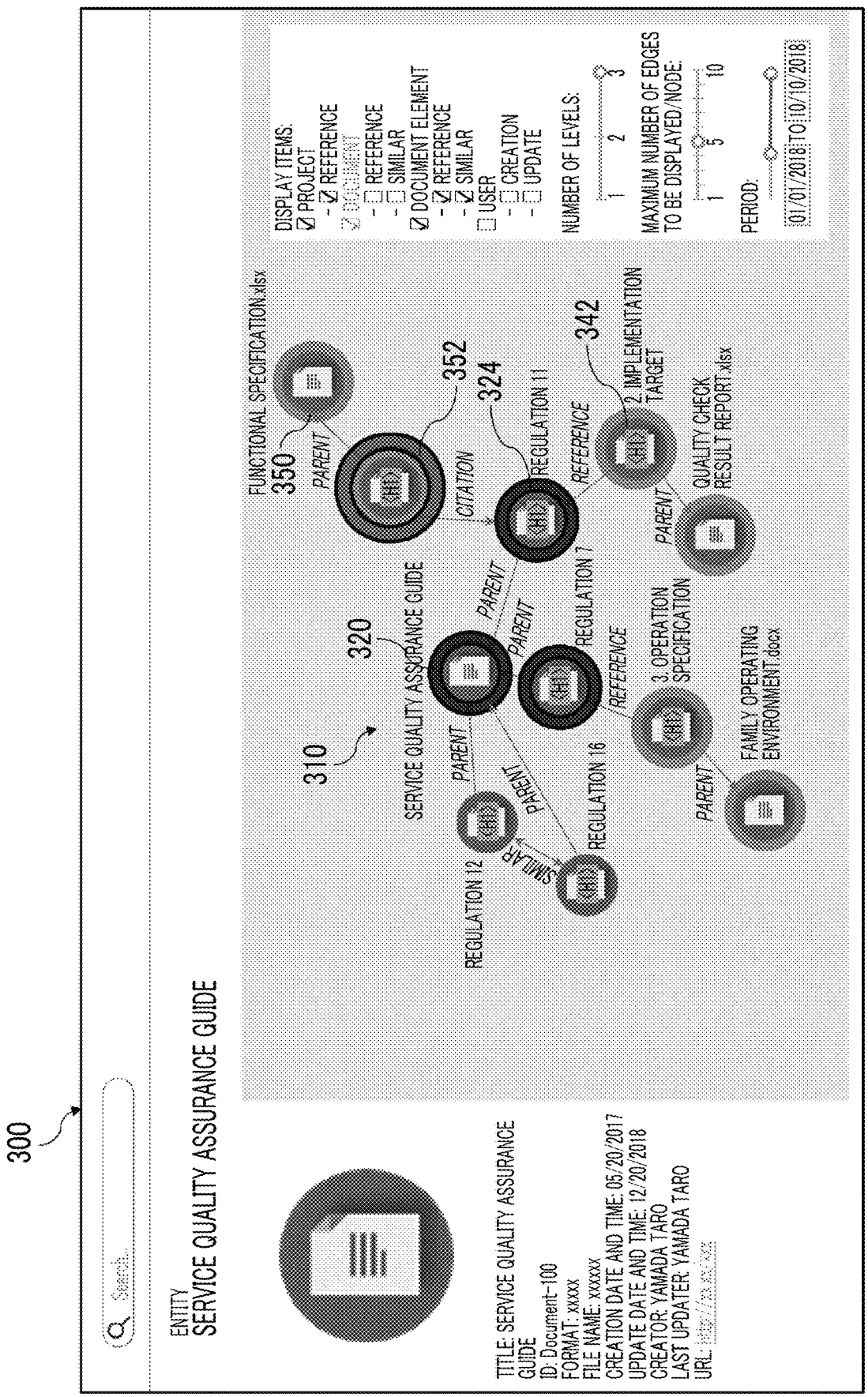
FIG. 13 is a diagram illustrating still another example of the information providing screen provided by the document service system.

The document elements 332 and 342 related to the changed document elements 322 and 324 and the nodes of the documents 330 and 340 that are the parents of the document elements 332 and 342 are also highlighted in another display form. In the example illustrated in FIG. 9, the relation between the document elements 322 and 332 and the relation between the document elements 324 and 342 are both "reference". Thus, the highlighted display forms of the document element 332 and the document element 342 are identical to each other. On the contrary, in a case where the two types of relation are different from each other, the highlighted display forms of the document element 332 and the document element 342 are different from each other. For example, as illustrated in FIG. 13 described later, a node of the document element 352 having a relation of "citation" to the changed document element 324 is displayed in a display form which is more prominent than that for the "reference" relation. Since the similarity of the content between the two document elements is much higher in "citation" than in "reference", the necessity to correct the content in response to the changed document element is considered to be much higher in "citation".

Figure 10:
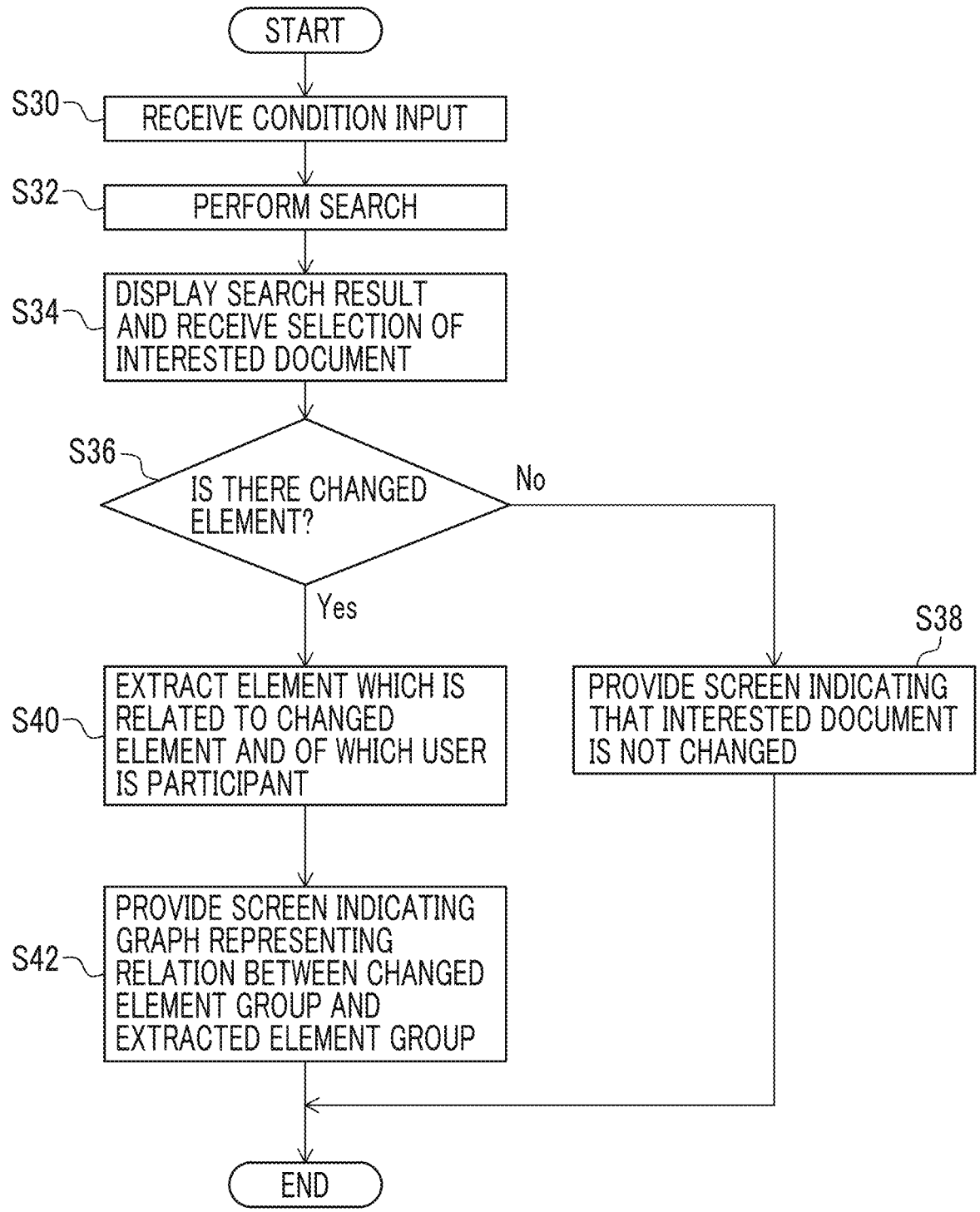
FIG. 10 is a diagram illustrating a processing procedure for generating the information providing screen, which is performed by the document service system.

FIG. 10 illustrates an example of a processing procedure of creating the information providing screen 300 illustrated in FIG. 9.

In the procedure of FIG. 10, the processor 102 of the document service system 100 provides an input screen for inputting search conditions and the like to the client 30 in a form of a web page, for example. The processor receives the input of the search conditions and the like from the user (S30). The processor 102 searches the database for a document that satisfies the input search condition (S32). The processor provides the client 30 with a screen showing a list of documents as the search result, and receives the selection of the interested document from the user (S34). FIG. 9 illustrates an example of a case where the user selects the document 320 "service quality assurance guide" as an interested document.

The processor 102 examines the element property of each document element belonging to the interested document selected by the user, to specify the document element which has been changed within a predetermined period and determine whether there is a changed document element (S36). In a case where there is no changed document element in the interested document, the processor 102 generates a screen indicating that there is no changed document element in the interested document, and causes the client 30 to display the screen (S38).

In a case where the determination result in S36 is Yes, the processor 102 obtains a document element related to the specified changed document element from the relation information in the database (see FIG. 8). The processor extracts a document element of which the user is a participant among the obtained document elements (S40). The extraction may be performed with reference to the element property of the obtained document element. The processor 102 generates a graph 310 indicating the relation between a set of the changed document element obtained in S36 and the document to which the obtained document element belongs, and a set of the document element extracted in S40 and the document to which the extracted document element belongs. Then, an information providing screen 300 including the graph 310 is provided to the client 30 (S42). The processor 102 determines the display mode of the node for each document element to be displayed on the graph 310, in accordance with whether or not the document element is changed, or the type of relation between this document element and the changed document element.

Figure 11:
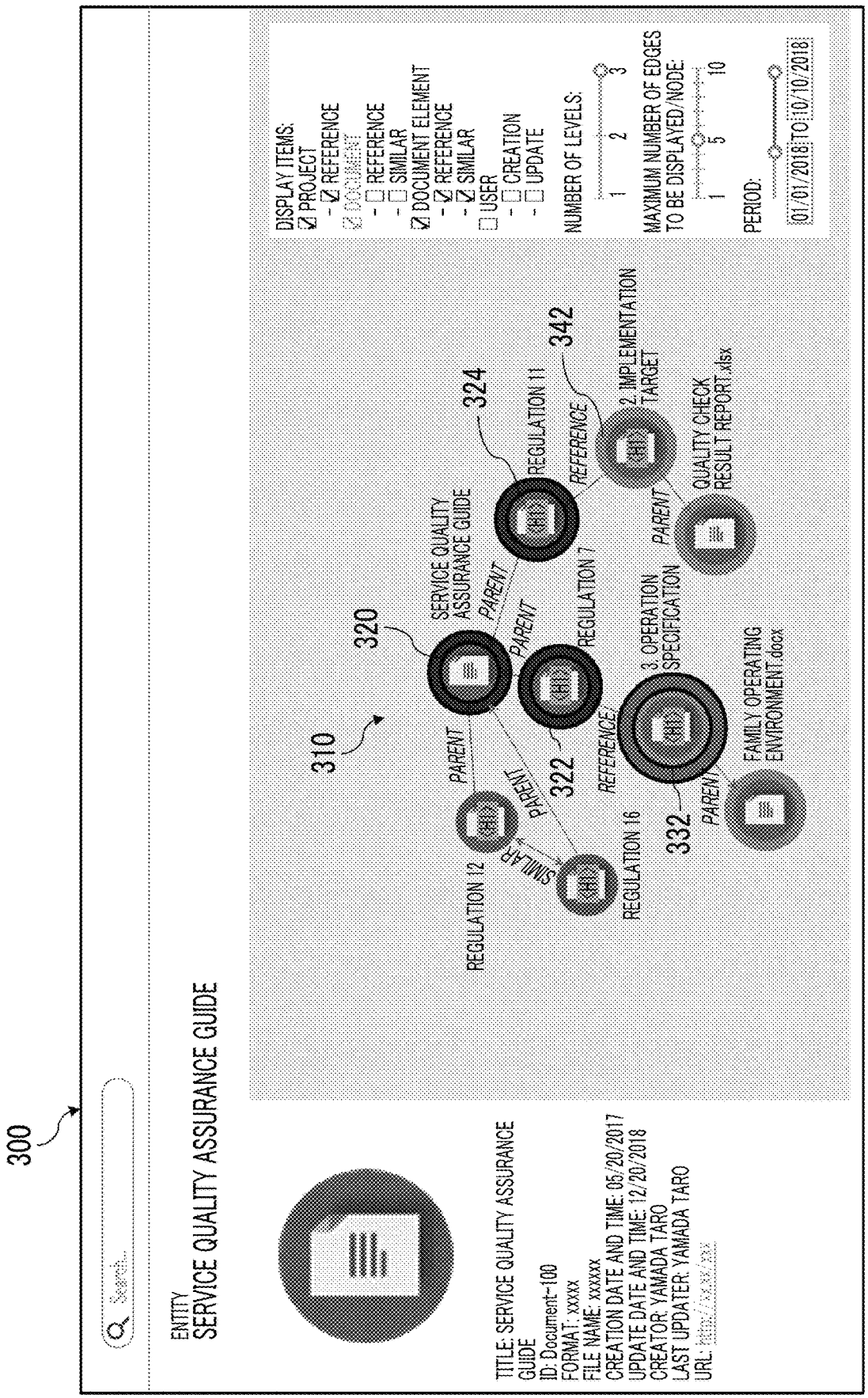
FIG. 11 is a diagram illustrating another example of the information providing screen provided by the document service system.

FIG. 11 illustrates another example of the information providing screen 300 provided by the document service system 100 to the user.

In the graph 310 illustrated in FIG. 11, among the document elements 332 and 342 of which users are participants and which are related to the changed document elements 322 and 324 in the interested document 320, the document element 332 of which the content is not changed after the change of the document elements 322 and 324 is highlighted. On the contrary, the content of the document element 342 related to the changed document element 324 has been changed after the change of the document element 324, and thus the document element 342 is not highlighted.

In a case where the document element 322 is changed, whether the document element related to the document element 322 is required to be changed is checked. In a case where the document element is required to be changed, the change is performed on the document element. Thus, the user is urged to check a document element by highlighting the unchanged document element among document elements related to the changed document element.

Figure 12:
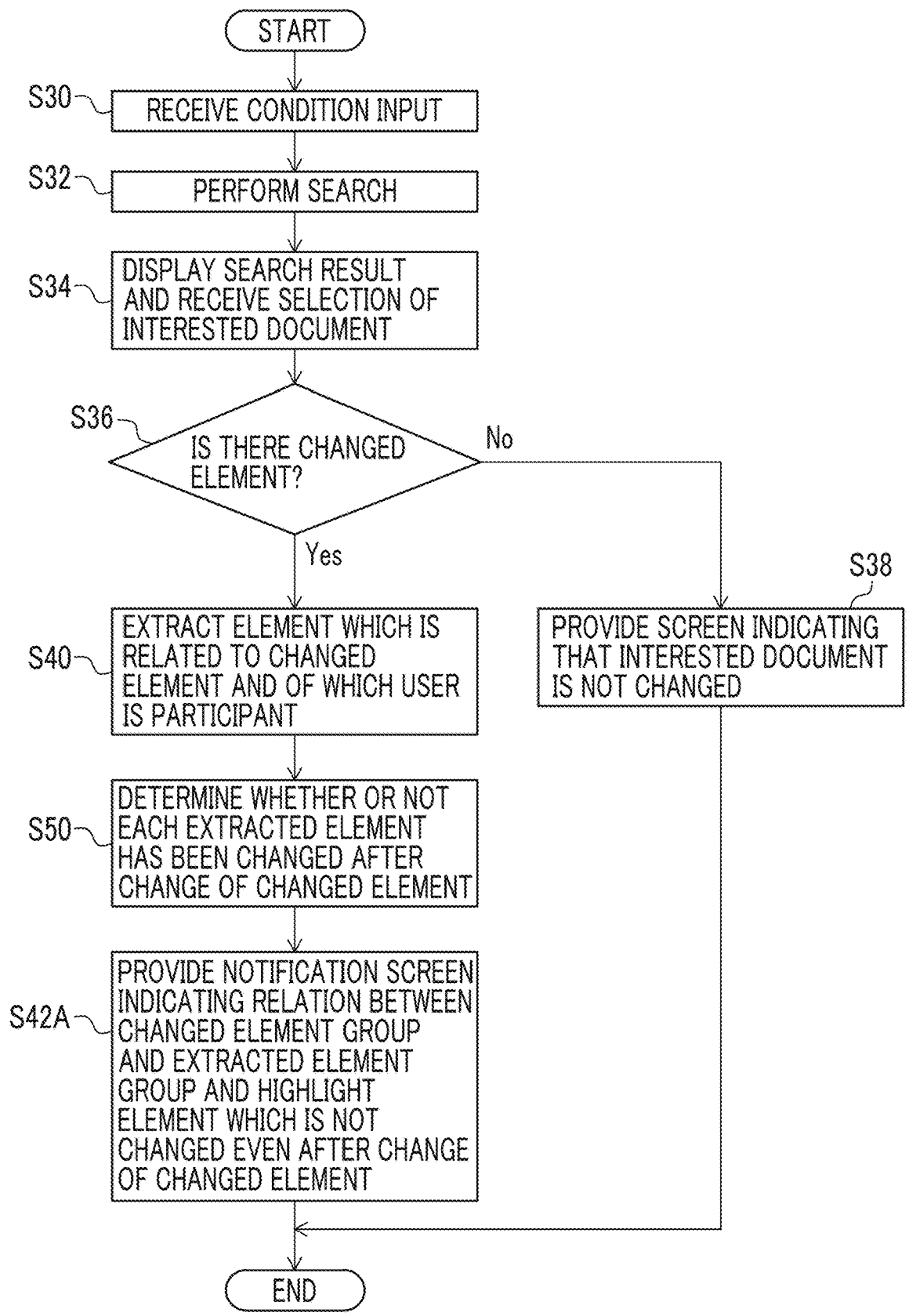
FIG. 12 is a diagram illustrating another example of the processing procedure for generating the information providing screen, which is performed by the document service system.

FIG. 12 illustrates an example of a processing procedure of creating the information providing screen 300 illustrated in FIG. 11. In the procedure of FIG. 12, steps of performing the similar processing to the procedure of FIG. 10 are denoted by the identical reference signs, and description thereof will be omitted.

In the procedure of FIG. 12, the processor 102 determines whether or not the document element extracted in S40 is changed after the corresponding changed document element has been changed (S50). For example, in a case where the last update date and time of the document element as a determination target is later than the last update date and time of the corresponding changed document element, the change is determined, in S50, to be completed, and otherwise the document element is determined, in S50, not to be changed. In the example of FIG. 10, since the last update date and time of the document element 332 is earlier than the last update date and time of the corresponding changed document element 322, the document element 332 is determined not to be changed.

The processor 102 generates the graph 310 and highlights the node of the document element determined, in S50, not to be changed in the graph 310 in a special display form for a notification indicating that the document element is not changed. Then, the information providing screen 300 including the graph 310 is provided to the client 30 (S42A).

The user selects the changed document element 322 and the node of the document element 332 which has been highlighted and not changed, on the information providing screen 300 displayed in the client 30. In response, the processor 102 of the document service system 100 provides the client 30 with a screen of displaying the latest content of the selected document element. The user checks the content of each document element on the screen, and determines whether the content of the document element 332 is required to be changed. In a case where the change of the document element 332 is determined to be required, the user performs a required change of the content of the document element 332. In response to the change, the processor 102 changes the element content or the content characteristic of the element property (see FIG. 7) of the document element 332 in the database. The processor 102 accesses the document management system that manages the document to which the document element 332 belongs, using the information on the storage location in the element property. The processor applies the change to a part corresponding to the document element 332 in the original document.

After a document element has been changed, the user may check whether a document element related to the changed document element is changed in response to the change. As a result, the user may determine that the change is not required. In this case, although the content of the latter document element has not been changed, the required check has already been completed. Thus, in a case where the highlight is displayed on the graph 310, the user is required to perform the useless check. Therefore, the processor 102 of the document service system 100 not only receives the edit of the content on the screen of displaying the content of the selected document element on the information providing screen 300, but also receives the designation of whether or not the content is checked. In a case where the designation that the check from the user is performed is made, the last update date and time of the document element is changed to the designated time. Thus, a situation in which the document element is highlighted to display being not changed on the subsequent information providing screen 300 does not occur.

FIG. 13 illustrates still another example of the information providing screen 300 provided by the document service system 100 to the user.

In the graph 310 illustrated in FIG. 13, in addition to the node group illustrated in FIG. 9, nodes of another document element 352 of which the user is a participant and which is related to the changed document element 322 and a document 350 (document name "functional specification.xlsx") being the parent of the document element 352 are displayed. The document element 352 has a relation of "citation" to the changed document element 324. That is, the content of the document element 352 is identical or very close to the content of the document element 324. Although the other document elements 342 also has a relation with the identical document element 324, the relation is "reference" in which the similarity of the content between the document elements is much lower than "citation". For this reason, the node of the document element 352 is highlighted in a display form indicating the relation of "citation", and the display form is more conspicuous than the display form indicating the relation of "reference".

In this example, in a case where the document service system 100 detects the document element 352 having a relation of "citation" to the changed document element 322, the document service system 100 updates the content of the document element 352 to match with the content of the changed document element 322. That is, for example, the content of the changed document element 322 is overwritten on the document element 352.

The update is performed on the element content (see FIG. 7) of the document element 352 in the database of the document service system 100. The similar update is performed on original data of the document 350 in the document management system (not illustrated) that manages the document 350 including the document element 352.

The update may be automatically performed by the document service system 100 without waiting for the check of the user. As another example, the user is required to check whether or not the update is performed. In a case where an instruction to perform update is obtained from the user, the document service system 100 may perform the update.

Figure 14:
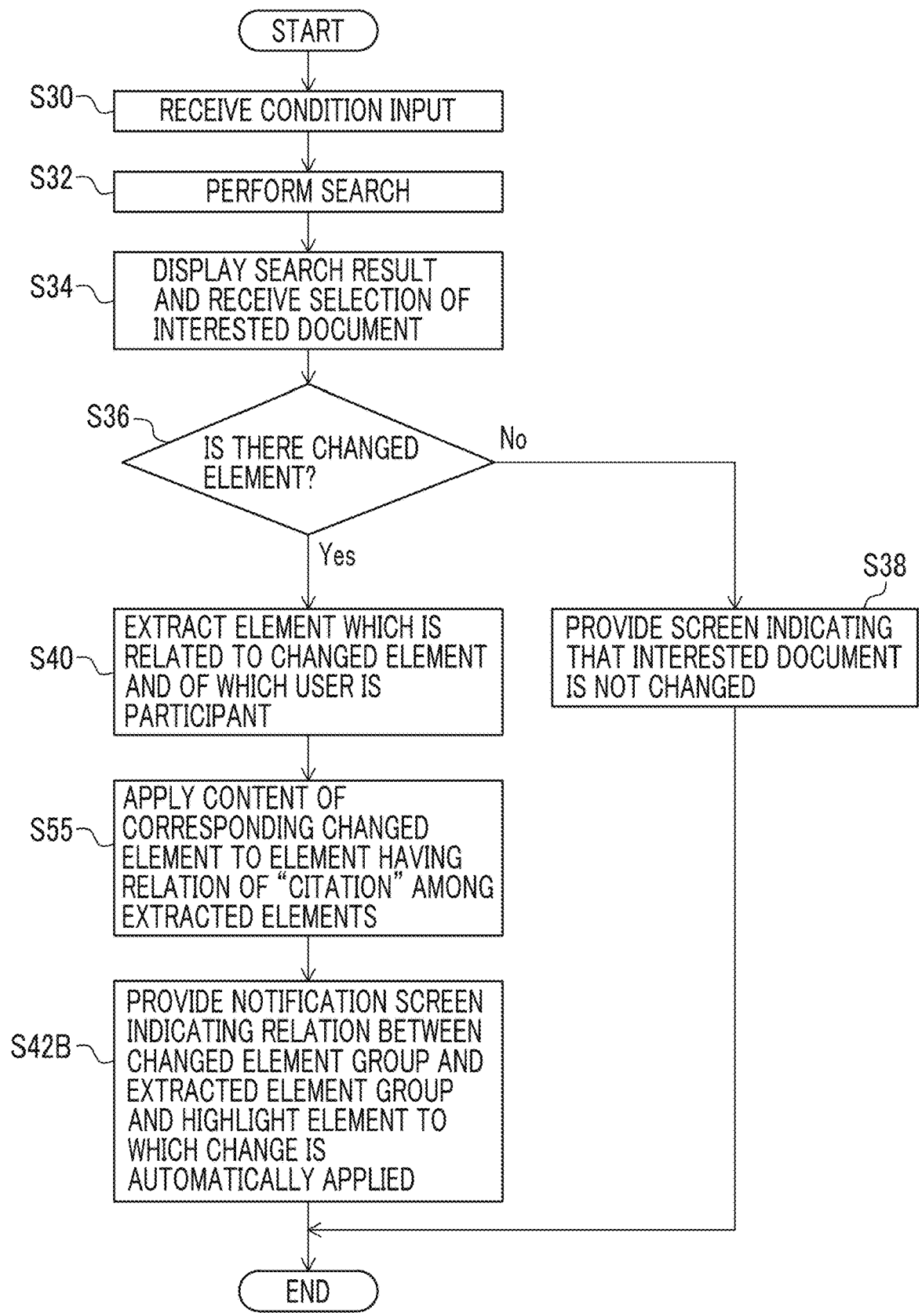
FIG. 14 is a diagram illustrating still another example of the processing procedure for generating the information providing screen, which is performed by the document service system.

FIG. 14 illustrates an example of a processing procedure of the document service system 100 in the example of FIG. 13. In the procedure of FIG. 12, steps of performing the similar processing to the procedure of FIG. 10 are denoted by the identical reference signs, and description thereof will be omitted.

In the procedure of FIG. 14, the processor 102 examines whether or not a document element (referred to as a target element) having a relation of "citation" to the changed document element (referred to as a changed element) is provided among document elements extracted in S40. In a case where the target element is provided, the processor updates the element content of the target element in the database in the document service system 100 and the document in the document management system that manages the document including the target element, so as to match with the changed content of the changed element (S55). With this update, the content characteristic, the last updater, the update date and time, and the like of the element property of the target element in the database and the document characteristic, the last updater, the update date and time, and the like of the document property (see FIG. 6) of the document including the target element are also updated.

The processor 102 provides the client 30 with a screen for inquiring whether or not to update the target element. In a case where an instruction to perform the update is made on the screen by the user, S55 may be performed. In a case where an instruction indicating that the update is not performed is input from the user on the screen, the processor 102 does not perform S55.

The processor 102 generates the graph 310, and highlights the node of the document element having a relation of "citation" to the changed document element in the graph 310, in a special display form indicating "citation". Then, the processor provides the client 30 with the information providing screen 300 including the graph 310 (S42B).

In the above description, the three examples of the information providing screen 300, which are illustrated in FIGS. 9, 11, and 13 are separately described. However, the display control in the three examples may be combined. For example, a document element having a relation to a changed document element is displayed in a display form corresponding to the type of relation, and, in a case where the latter document element is not changed after the former has been changed, the highlight indicating that the document element is not changed is added to the latter.

Figure 15:
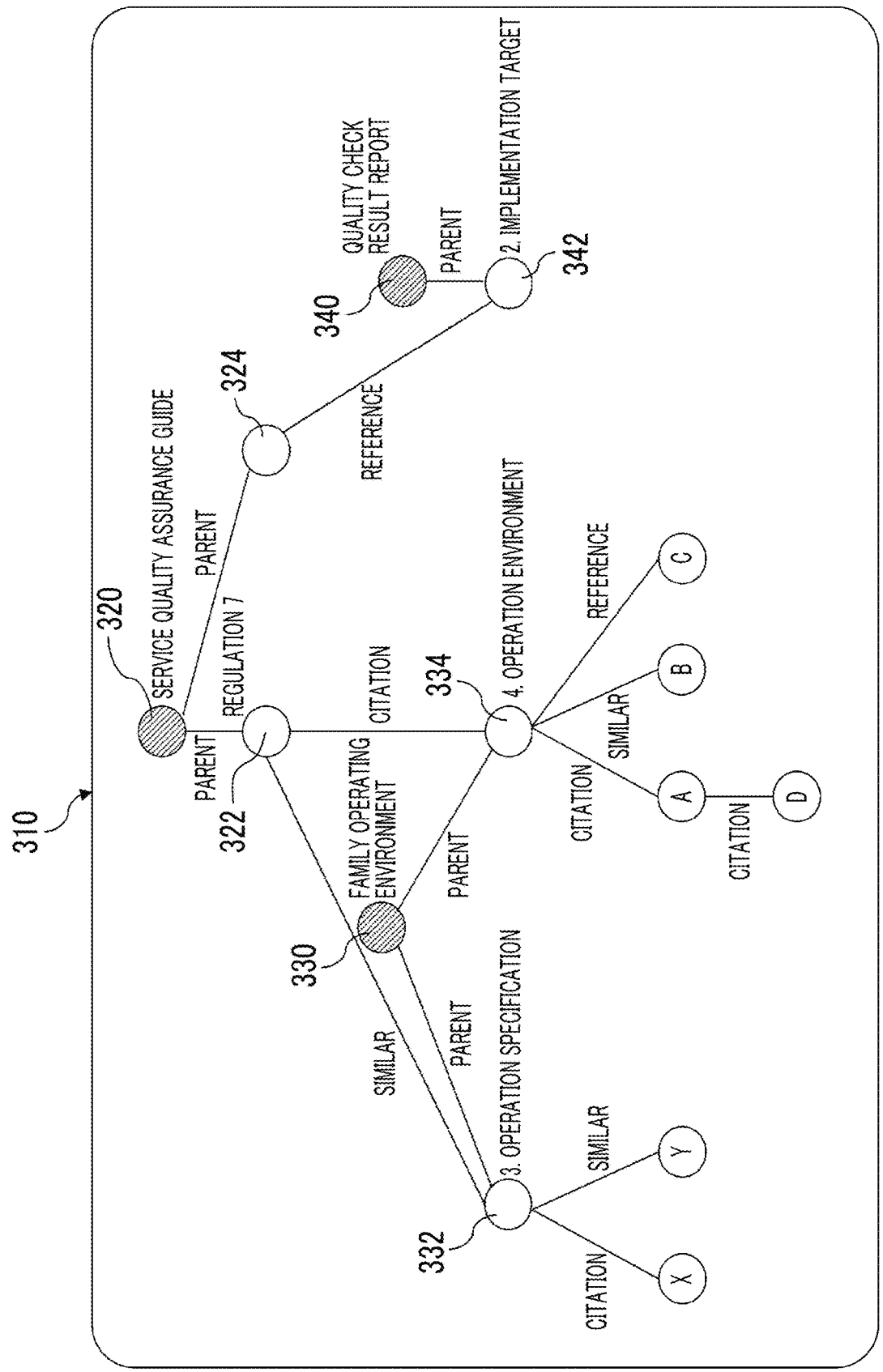
FIG. 15 is a diagram illustrating an example of a graph display provided by the document service system.

FIG. 15 illustrates another example of the graph 310 in the information providing screen 300 provided by the document service system 100 to the user.

The graph 310 illustrated in FIG. 15 is obtained by adding a document element 334 and nodes of document elements A, B, C, D, X, and Y to the graph 310 illustrated in FIG. 9 and changing the relation between the document elements 322 and 334 from "reference" to "similar". As described above, "similar" has a higher similarity of the content between the document elements than the similarity for "reference".

The document element 334 (element name "4. operating environment") is a document element in the document 330, and has a relation of "citation" to the changed document element 322 in the document 320. The document elements A, B, and C have a relation of "citation", "similar", and "reference" to the document element 334, respectively. The document element D has a relation of "citation" to the document element A.

The document elements X and Y have a relation of "citation" and "similar" to the document element 332, respectively.

As described above, the document elements A, B, C, D, X, and Y which do not have a direct relation to the changed document element 322 are also displayed on the graph 310 of FIG. 15. The display control of the document element which does not have a direct relation to the changed document element will be described below.

Here, in the following description, a changed document element in a document designated by the user is referred to as a changed element, and a document element having a direct relation to the changed element is referred to as a primary element. An element having a relation to the primary element is referred to as a secondary element, and a document element having a relation to the secondary element is referred to as a tertiary element. In the example of FIG. 15, the document elements 322 and 324 are changed elements, and the document elements 332, 334 and 342 are primary elements. The document elements A, B, C, X, and Y are secondary elements, and the document element D is a tertiary element. The secondary and tertiary elements do not have a direct relation to the changed element. In the following description, a relation between the changed element and the primary element is referred to as a primary relation. A relation between the primary element and the secondary element is referred to as a secondary relation. A relation between the secondary element and the tertiary element is referred to as a tertiary relation. In general, the relation between the (n−1)-th ordered element and the n-th ordered element is an n-ordered relation (n is an integer of 1 or more). However, in this case, the changed element is a zero-order element.

First, the processor 102 of the document service system 100 restricts the types of secondary relations to be included in the graph 310, that is, to be displayed, in accordance with the type of the corresponding primary relation. That is, as the type of the primary relation becomes "stronger", the number of the types of the corresponding secondary relations included in the graph 310 are increased. The "weaker" relation is harder to be included in the graph 310. The primary relation is included in the graph 310 regardless of the type, but, regarding the secondary relation, only the type restricted in accordance with the type of the corresponding primary relation is included in the graph 310. In the three types of relations exemplified above, "citation", "similar", and "reference", "citation" is the strongest, the next is "similar", and the weakest is "reference". The strength relation reflects the magnitude relation of the content similarity between the document elements forming the respective types of relations.

In the example of FIG. 15, in a case where the primary relation is "citation", all three types of secondary relations are displayed. In a case where the primary relation is "similar", only two types of secondary relations of "citation" and "similar" are displayed. In a case where the primary relation is "reference", only one type of secondary relation "citation" is displayed.

For example, regarding the primary element 334 having a primary relation of "citation" to the changed element 322, all types of secondary relations "citation" (that is, relation to the secondary element A), "similarity" (that is, relation to the secondary element B), and "reference" (that is, relation to the secondary element C) are displayed.

On the other hand, regarding the primary element 332 having a primary relation of "similar" to the changed element 322, only two types of secondary relations "citation" (that is, relation to the secondary element X) and "similar" (that is, relation to the secondary element Y) are displayed. Even though there is a secondary element having a secondary relation of the type "reference" to the primary element 332, the secondary relation and the secondary element are not displayed on the graph 310.

Regarding the primary element 342 having a primary relation of "reference" to the changed element 324, the secondary relation and the secondary element are not displayed on the graph 310. For the primary element having the primary relation of "reference" to the changed element, the secondary relation of the type "citation" being the strongest may be displayed. However, in the example of FIG. 15, the secondary element having a secondary relation of "citation" to the primary element 342 is not provided. Thus, such a secondary element is not displayed. Even though the secondary element having a relation of "similar" or "reference" to the primary element 342 is provided, this secondary element is not displayed on the graph 310.

The processor 102 may determine the upper limit value of n of the n-th ordered relation included in the graph 310, in accordance with the type of the primary relation.

In the example of FIG. 15, regarding a relation extending from the primary relation of "citation" between the document elements 322 and 334, the relation up to the third order in maximum is included in the graph 310. On the contrary, regarding a relation extending from the primary relation of "similar" weaker than "citation", the relation is included in the graph 310 only up to the second order. Since the primary relation between the document elements 322 and 332 is "similar", even though a tertiary element having a strong tertiary relation such as "citation" to the secondary element X related to the primary element 332 is provided, the tertiary relation and the tertiary element are not displayed on the graph 310.

In the example of FIG. 15, even though a document element is related to the changed document element in the document searched in S32, the document element included in the identical document (that is, searched document) to a document of the changed document element is not displayed on the graph 310 provided for the user. This is because the user does not normally have an edit authority for the searched document or the document element in the searched document. However, for each document element related to the changed document element, whether or not the user has an edit authority is checked. In a case where the user has the edit authority, even the document element in the identical document to the document for the changed document element may be displayed on the graph 310.

Another Example of Service

In the example described above, the document service system 100 simply records the change of the document element in the database at a time point at which the document service system detects the change of the document element.

Information on the change is provided to the user at a time point at which the user designates a document including the document element, and the information providing screen 300 for the document is provided to the user in response to the designation.

As another example of this, processing of notifying a participant of another document element having a relation to a document element in a case where the document service system 100 detects that the content of the document element has been changed will be described below.

Figure 16:
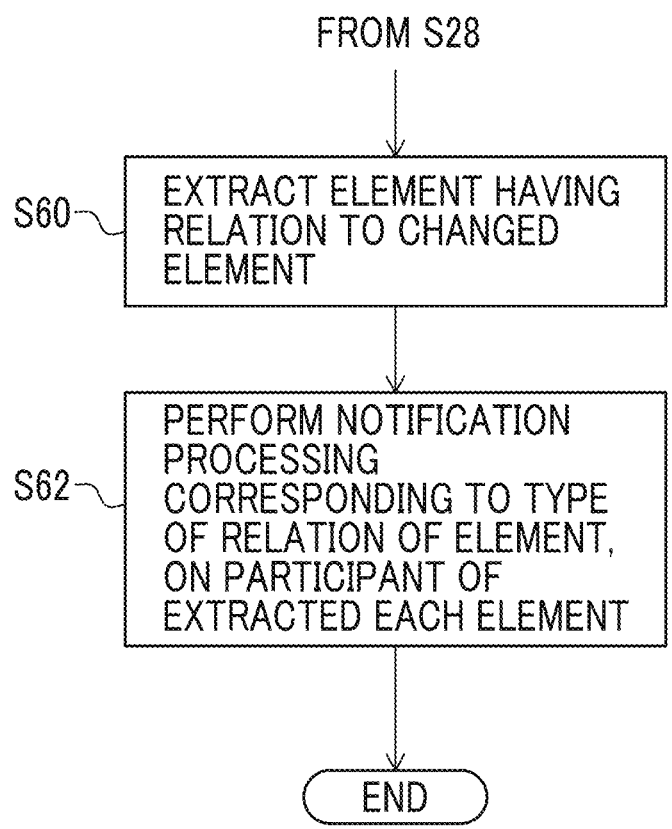
FIG. 16 is a diagram illustrating a part of a procedure of notification processing performed by the document service system.

FIG. 16 illustrates an example of the procedure of this processing. The procedure of FIG. 16 illustrates a group of steps following S28 in the procedure illustrated in FIG. 4.

In the procedure of FIG. 16, in a case where the processor 102 detects the changed document element in S22 (see FIG. 4), the processor 102 extracts a document element group having a relation to the changed document element from relation information (see FIG. 8) in the database (S60). The processor 102 obtains information on a participant of the document element from the database for each extracted document element and notifies the participant of the change in a notification method corresponding to the type of relation (S62). A plurality of methods, for example, as follows are provided as a method of notifying the participant: a method of displaying the notification in a notification field on a portal page displayed in a case where the participant logs into the document service system 100; a method of display a message for causing the change to be known, on a screen such as the information providing screen 300 provided to the participant by the document service system 100 in a form of a pop-up screen; and a method of transmitting an e-mail to an e-mail address of the participant, which has been registered in the document service system 100 by the participant. The notification field is not displayed so long as the participant does not log into the document service system 100. However, the notification by e-mail reaches the participant even in a period in which the participant does not log into the document service system 100. Thus, the e-mail is more noticeable to the participant. In S62, the notification is performed by a method which is more noticeable to the participant as the type of the relation is stronger. For example, in a case where the type of the relation is "reference" and "similar", only display in the notification field on the portal page of the participant is performed. However, in a case where the type of the relation is "citation" being stronger than others, the participant is notified by e-mail in addition to the display into the notification field.

The exemplary embodiment described above are merely exemplary, and various modifications may be made within the scope of the present disclosure.

For example, in the exemplary embodiment, the type of the relation between the document elements is determined in accordance with the similarity of the content between the document elements, but this is just an example.

For example, a user who has created or updated a document element may register another document element having a relation with the document element and the type of the relation in the document service system 100.

A device that provides a user with a function of editing a document (for example, a document editing application provided by the client 30) may determine a relation between document elements in accordance with an operation performed by the user while the user is editing a document element, and the device may register the determined relation in the document service system 100. For example, in a case where the user copies a document element a in a document A opened on a screen of the device to a document element b in another document B opened on the screen by a copy and paste operation, the device determines that the document element b has the type of relation of "citation" to the document element a. Then, the device registers the relation of "citation" in the document service system 100. For example, in a case where another document element d is opened on the screen (copy and paste of the document elements d to c is not performed) while the user is editing a document element c opened on the screen, the device determines that the document element c has a relation of "reference" to the document element d.

Exemplary Embodiment of Association Between Document Elements

In the above-described example, descriptions are made focusing on a method of determining the type of relation based on the similarity between contents of the document elements, as a method of associating the document elements (that is, determining the type of relation between the two document elements) with each other.

Here, even in a case where the contents of the document elements are not similar, in a case where one of the document elements includes a description representing the relation with the other document element, the document elements have a relation corresponding to the description. Detection of a relation indicated by the description representing such a relation only by the similarity between the contents of the document elements is not possible.

Thus, in the following exemplary embodiment, a method of associating document elements with each other based on a description which is included in the document element and indicates a relation to another document element will be described.

An outline of such a method will be described with reference to FIG. 17. In the example illustrated in FIG. 17, a certain document element 510 in a certain document 500 includes a description 512 representing a relation to another document element. The description 512 has text contents of "please refer to "1. standard power consumption test device"

in "test environment list" for the test environment". The text content includes information for specifying a document element 522 as a relation destination of the document element 510 and a phrase representing the relation.

The information for specifying the document element 522 as the relation destination includes "test environment list" which is the document name of a document 520 including the document element 522 and "1. standard power consumption test device" which is the name of the document element 522. The name of the document element is, for example, the heading of the document element. The name of the document element 522 is referred to as an element name below. The phrase representing the relation in the document element 510 is the phrase "please refer to". In the example, each of the document name and the element name is described in a form surrounded by a predetermined code.

Figure 17:
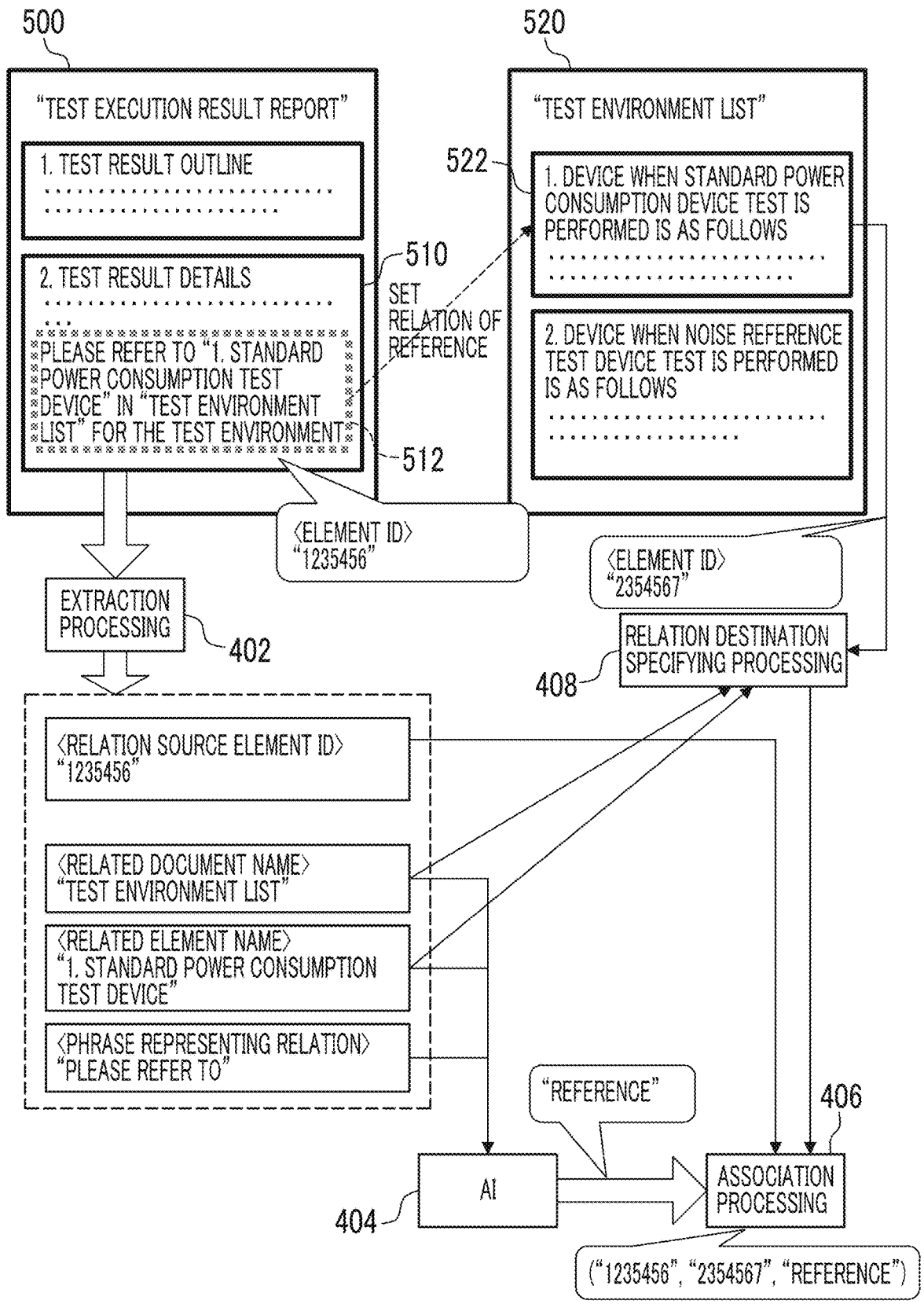
FIG. 17 is a diagram illustrating an exemplary embodiment of a method of determining the type of relation between document elements.

In the example illustrated in FIG. 17, the document name is described in accordance with a rule of being enclosed by square brackets ([ ]) before and after the document name, and the element name is described in accordance with a rule of being enclosed brackets (" ") before and after the element name. The notation rules of the document name and the element name are just examples. For example, another notation rules in which the document name and the element name are written in typefaces which are different from the typeface of the ground sentence and are different from each other may be used. The notation rules for the document name and the element name may not be necessarily unified. For example, the notation rule may be different for each document management system such as the design document management system 10 and the company rule management system 20.

An element ID "1235456" is assumed to be embedded in the document element 510.

The document service system 100 performs extraction processing 402 for extracting a description and the like representing a relation to another document element among document elements. From the document element 510, a description 512 representing a relation to another document element is detected by the extraction processing 402, and "test environment list" which is the related document name included in the description 512, "1. standard power consumption test device" which is the related element name, and "please refer to" which is a phrase representing the relation are extracted.

In the extraction processing 402, for example, natural language analysis is performed on text data of the document element, and thus a phrase representing a relation is obtained from the text data. For example, a phrase including a word which means a relation to another document element such as "refer to", "cite", "based on", and "in accordance with" and has a positive meaning is detected as the phrase representing the relation by the natural language analysis. In the extraction processing 402, a text string satisfying the notation rule for the document name and the element name is searched in a sentence identical to the phrase representing the relation or is searched from the vicinity of the phrase. In this manner, the document name and the element name as a relation destination, which function as the object of the phrase are obtained. In a case where a set of a phrase representing a relation, and the related document name and the related element name serving as the object of the phase, is found, a description (for example, sentence) including such a set is the description representing the relation to another document element. In the example illustrated in FIG. 17, the extraction processing 402 extracts, in particular, the related document name, the related element name, and the phrase representing the relation from the description.

There is a document element which does not include a description representing a relation to another document element, and the information is not extracted from such a document element.

In the extraction processing 402, "1235456" being the element ID of the document element 510 is extracted as a relation source element ID.

The extracted set of the related document name, the related element name, and the phrase representing the relation is input to the AI (artificial intelligence) 404. The AI 404 has already machine-learned such that, in a case where a set of a related document name, a related element name, and a phrase representing a relation is input, the type of relation corresponding to the set is obtained and output. The type of relation output by the AI 404 is the type of relation between the document element 510 as a relation source and a document element as a relation destination, which is specified by the related document name and the related element name. The machine learning of the AI 404 is performed, for example, in a manner that multiple pieces of learning data including a set of a related document name, a related element name, and a phrase representing a relation, and the type of a relation are prepared, the set of the related document name, the related element name, and the phrase representing a relation is given to the AI 404 as input data, and the type of relation is given to the AI 404 as teacher data.

The AI 404 is built in the document service system 100 (see FIG. 1) or in a device that can communicate with the document service system 100. A method of mounting the AI is not particularly limited. Any known machine learning method such as a regression method (for example, a neural network and a support vector machine), or a method using a tree such as a decision tree may be used. The AI may be configured as software, configured as a hardware circuit, or configured as a combination of a hardware circuit and software.

In the example of FIG. 17, the AI 404 outputs the type of relation of "reference" in response to an input of "test environment list" as the related document name, "1. standard power consumption test device" as the related element name, and "please refer to" as the phrase representing the relation.

The types of relation between document elements include, for example, citation, being similar, and reference. The type of relation may be freely defined by the user of the system. A case where there is no relation between document elements may be defined as one of the types of relation (for example, type named "irrelevance") between document elements.

In association processing 406 performed by the document service system 100, the relation source element ID extracted in the extraction processing 402 and the element ID of a document element as a relation destination represented by the related document name and the related element name are associated with the type of relation obtained by the AI 404. For this association, in relation destination specifying processing 408, a document element corresponding to a combination of a relation source document name and a relation source element name is obtained from a document management system group of the design document management system 10, the company rule management system 20, and the law management system 60, and the like. In the example illustrated in FIG. 17, the document element 522 in the document 520 is specified as the document element as the relation destination, by the relation destination specifying processing 408.

In the association processing 406, "reference" as the type of relation with respect to the combination of "1235456" as the relation source element ID and "2354567" which is an element ID of a document element as the specified relation destination is registered for the relation information (see FIG. 8) in the database.

Next, an example of a procedure of the association processing between document elements based on a description representing a relation to another document element will be described with reference to FIG. 18. The procedure illustrated in FIG. 18 may be performed, for example, after S17 and S26 of the procedure in FIG. 4.

Figure 18:
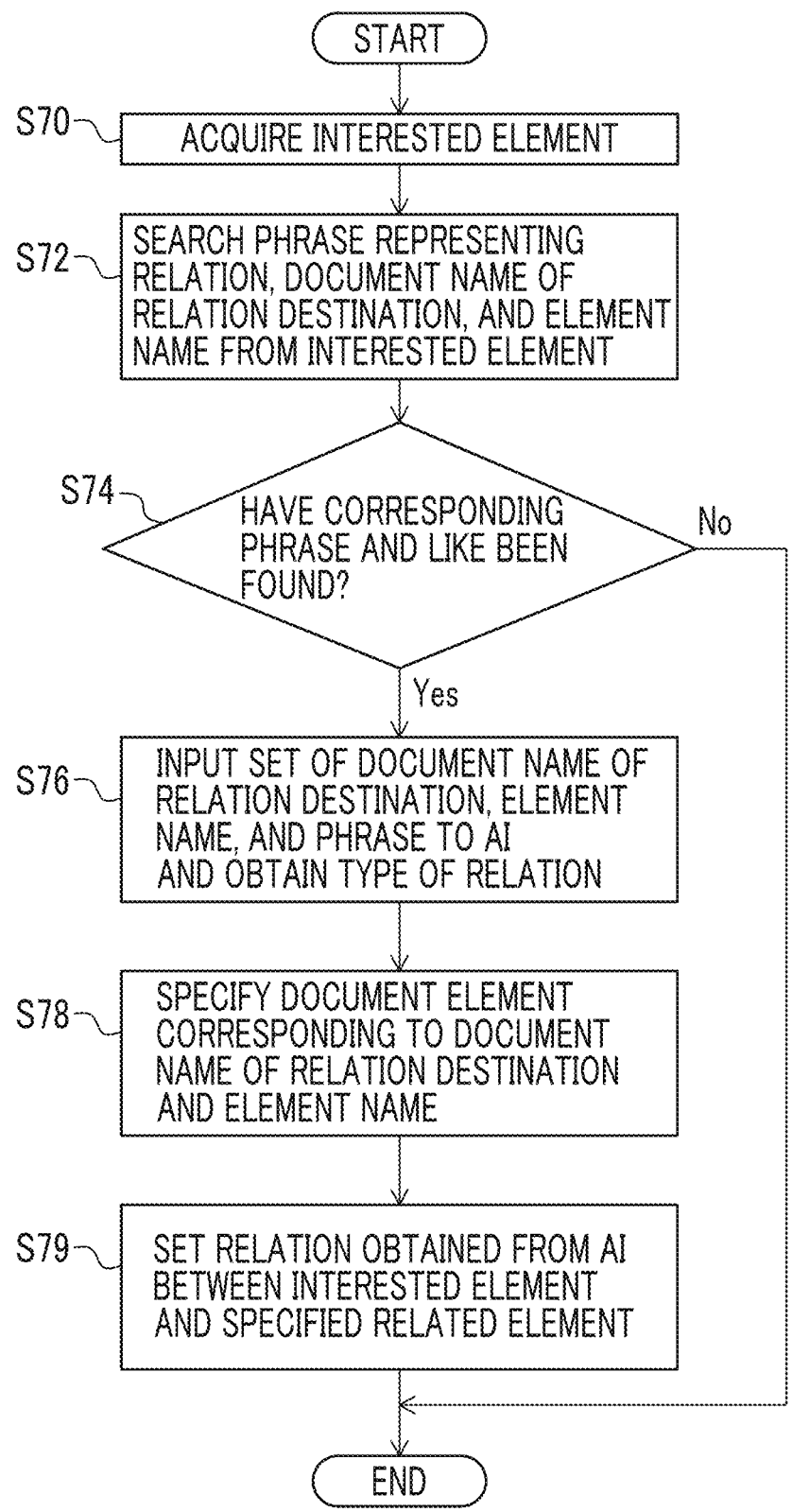
FIG. 18 is a diagram illustrating an example of a procedure for determining the type of relation between the document elements by the method in FIG. 17.

In the procedure of FIG. 18, firstly, the processor 102 of the document service system 100 acquires one document element in an interested document, and sets the acquired document element as an interested element (S70). Then, the processor 102 performs the extraction processing 402 to search for a set of a related document name, a related element name, and a phrase representing a relation from the interested element (S72) and to determine whether or not such a set is found (S74). In a case where such a set is not found in S74, the processing for the interested element is ended.

In a case where such a set is found, the processor 102 inputs the set of the related document name, the related element name, and the phrase representing the relation to the machine-learned AI 404. In response to the input, the AI 404 outputs the type of relation corresponding to the set (S76). The processor 102 performs the relation destination specifying processing 408 to specify a document element having the related element name, in a document having the related document name (S78). For example, in a case where the element name of each document element (for example, the heading of the document element) and the document name of a document including the document element are registered in the database of the document service system 100, such a document element may be specified by searching the database. In S78, a plurality of document elements having the related element name in the document having the related document name may be specified.

The processor 102 performs the association processing 406 to set the type of relation obtained from the AI 404 in S76, as the type of relation of the combination of the interested element and the related element specified in S78, in the relation information on the database (S79). In a case where a plurality of document elements are specified in S78, the type of the relation is set for the plurality of document elements. At a time point immediately before S79 is performed, the type of relation obtained from the content similarity in the procedure of FIG. 4 is registered in the relation information, as the type of relation between the interested element and the related element. In S79, the AI 404 overwrites the type of relation obtained from the description of the interested element, which represents a relation to another document element, to the value of the registered type of relation.

In the example described with reference to FIGS. 17 and 18, the AI 404 learns a combination of a set of a related document name, a related element name, and a phrase representing a relation, and the type of relation, which are included in multiple pieces of learning data. As described above, the type of relation corresponding to the related document name, the related element name, and the phrase representing the relation is obtained by using the learned AI 404.

The above description is made on the assumption that the procedure in FIG. 18 is performed after S17 and S26 of the procedure in FIG. 4, but this is just an example. Instead, designation of an interested element may be received from a user, and the procedure in FIG. 18 may be performed on the interested element. This is similarly applied to the following modification example.

Next, a modification example of the method of associating document element with each other will be described with reference to FIG. 19.

In the modification example, the type of relation between document elements is determined in consideration of not only the description representing the relation to another document elements among document elements, but also the attributes of the document elements.

In one example, the attribute of a document including the document element is directly used as the attribute of the document element used as a material for determining the type of relation between the document elements. The attributes of a document, which are used as the attributes of the document element include a storage location, a creator, the creation date and time, the last updater, the update date and time, the acquisition date and time, a search tag assigned to the document by a person, and the like.

An attribute unique to a document element may be used as the material for determining a relation between document elements. For example, in a case of a system that manages the history of creation or update for each document element, attributes such as a creator, the creation date and time, the update date and time, and the last updater of the document element may be recorded.

Regarding the attribute used to determine the relation, one type or a combination of a plurality of types (for example, combination of a storage location and a creator) may be provided.

Figure 19:
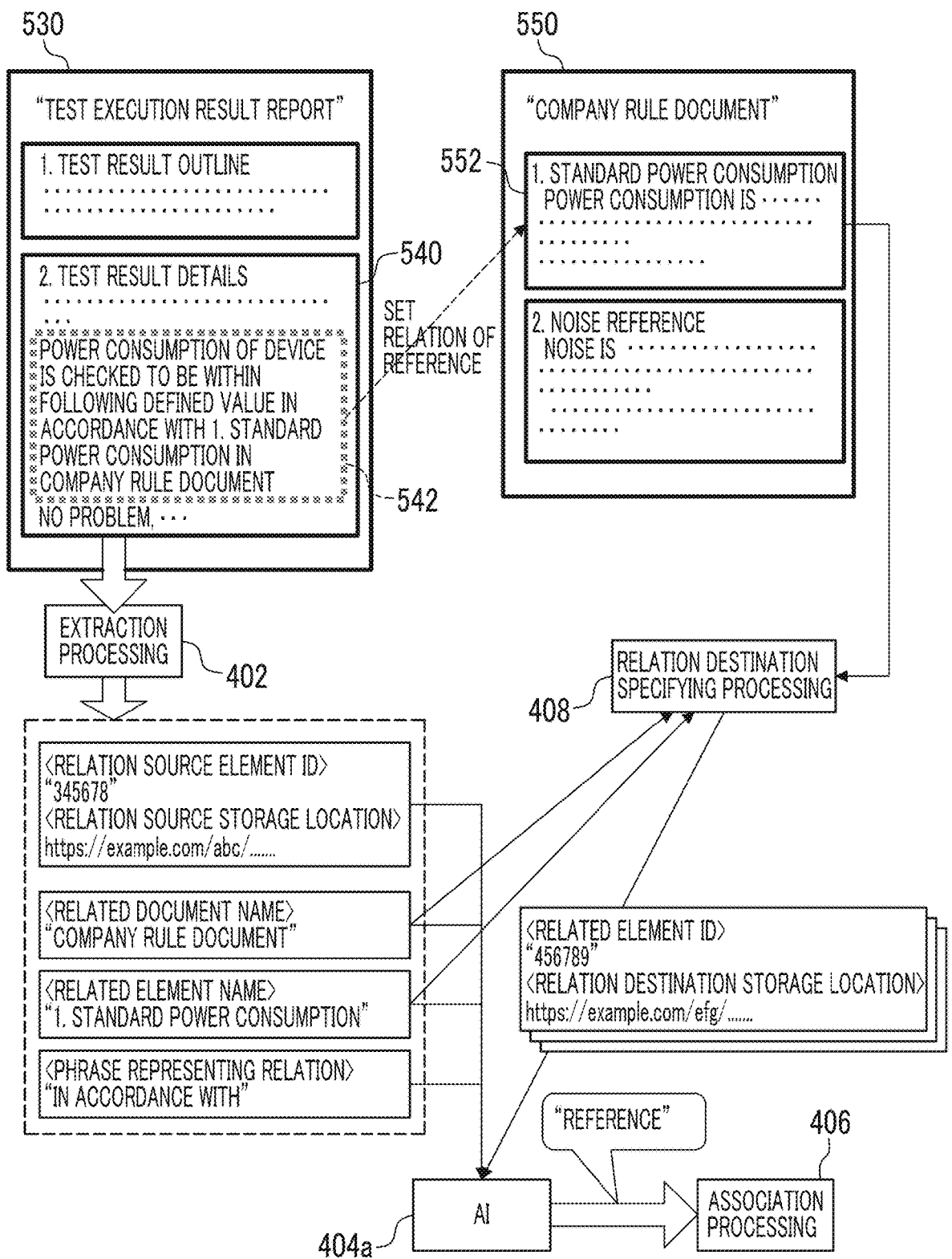
FIG. 19 is a diagram illustrating a modification example of the method of determining the type of relation between the document elements.

In the example of FIG. 19, the processor 102 finds out the description 542 representing the relation to another document element in the document element 540 in the document 530 by the extraction processing 402. Then, the processor extracts the related document name, the related element name, and the phrase representing the relation from the found description 542. In the example illustrated in FIG. 19, "company rule document" as the related document name, "1. standard power consumption" as the related element name, and "in accordance with" as the phrase representing the relation are extracted.

In the example, the "company rule document" and "1. standard power consumption" in the document element 540 are described without using a specific notation rule representing the document name or the like. Thus, distinguishment from a ground sentence is not possible. In such a case, for example, the processor 102 examines whether a text string corresponding to the document name and the element name stored in the database is in the document element 540. In a case where a text string corresponding to the document name and a text string corresponding to the element name in the database is provided at a part (for example, place corresponding to the object) indicating a target of the phrase representing the relation in the document element 540, the text strings refer to the related document name and the related element name. A case where the document name of the acquired document and the element name of a document element included in the document are associated with each other and are stored in the database for each acquired document may be considered. In this case, the processor 102 examines whether or not a set of a document name and an element name of a document element included in a document indicated by the document name is provided in the document element 540. Ina case where such a set is found, the processor extracts the set as the related document name and the related element name.

In the extraction processing 402, the attribute of the document element 540 is also extracted. In the example illustrated in FIG. 19, a URL indicating the storage location of the document element 540 is extracted as the attribute of the document element 540. In FIG. 19, the attribute is indicated as "relation source storage location".

The processor 102 performs the relation destination specifying processing 408 to specify a document element corresponding to the combination of the related document name and the related element name, from the document management system group of the design document management system 10 and the like. In the example illustrated in FIG. 19, a document element 552 in a document 550 is specified as the document element as the relation destination, by the relation destination specifying processing 408. In a case where an element ID of a document element is stored in the database in association with the set of a document name and an element name of the document element in a document indicated by the document name, the element ID of a document element corresponding to the combination of the related document name and the related element name is specified by the extraction processing 402. In this case, the document element corresponding to the combination of the related document name and the related element name is not required to be specified by the relation destination specifying processing 408 again.

In the relation destination specifying processing 408, the attribute of the document element specified as the relation destination is acquired. In the example illustrated in FIG. 19, as the attribute of the document element 552, a URL indicating the storage location of the document element 552 is extracted as "relation destination storage location".

The processor 102 inputs the related document name, the related element name, the phrase representing the relation, and the attributes (in the example illustrated in FIG. 19, relation source storage location and relation destination storage location) of the document elements as the relation source and the relation destination, to the AI 404a. In a case where a set of the related document name, the related element name, the phrase representing the relation, and the attributes of the document elements as the relation source and the relation destination is input, the AI 404a completes machine learning to obtain and output the type of relation corresponding to the set. The machine learning of the AI 404a is performed in a manner that the set of the related document name, the related element name, the phrase representing the relation, and the attributes of the document elements as the relation source and the relation destination is given to the AI 404a as input data, and the type of relation corresponding to the set is given to the AI 404a as teacher data.

In the example of FIG. 19, the AI 404a outputs the type of relation of "reference" in response to the input of a set of "company rule document" as the related document name, "1. standard power consumption" as the related element name, "in accordance with" as the phrase representing a relation, "https://example.com/abc/ . . . " as the relation source storage location, and "https://example.com/efg/ . . . " as the relation destination storage location.

In the association processing 406, "reference" as the type of relation with respect to the combination of "345678" as the relation source element ID and "456789" as the related element ID is registered for the relation information in the database.

In the example of FIG. 19, the storage location attribute of the document element is used for the determination, but an attribute other than the storage location attribute may be used. A plurality of attributes of the document element may be used for the determination.

Figure 20:
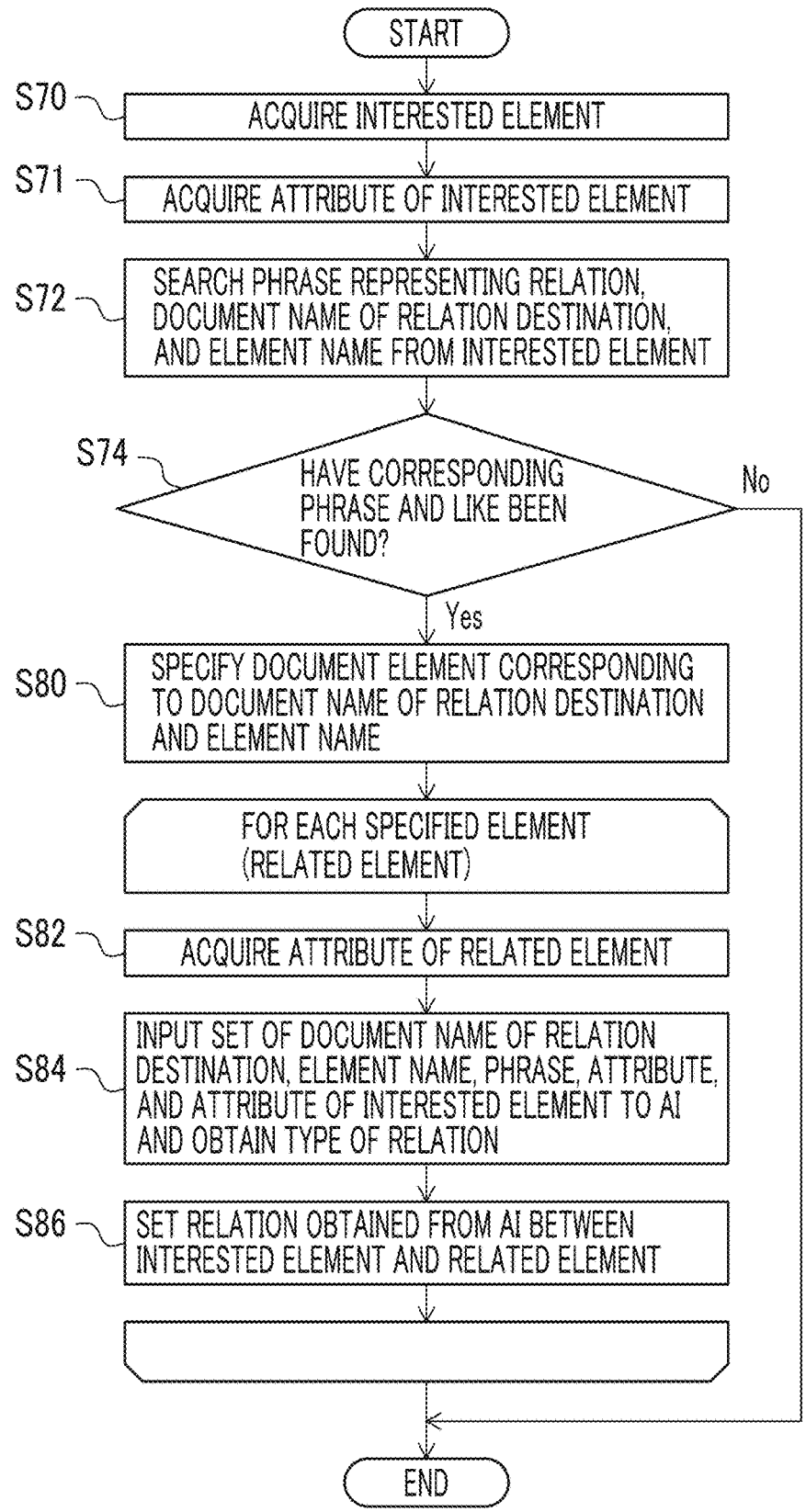
FIG. 20 is a diagram illustrating an example of a procedure for determining the type of relation between the document elements by the method in FIG. 19.

Next, a procedure of the association processing corresponding to the example of FIG. 19 will be described with reference to FIG. 20. The procedure illustrated in FIG. 20 is performed, for example, after S17 and S26 of the procedure illustrated in FIG. 4.

In the procedure, firstly, the processor 102 of the document service system 100 acquires one document element in an interested document, and sets the acquired document element as an interested element (S70). Then, the processor 102 performs the extraction processing 402 to acquire the attribute of the interested element (S71). Then, the processor 102 searches for a set of a related document name, a related element name, and a phrase representing a relation from the interested element (S72) and determines whether or not such a set is found (S74). In a case where such a set is not found in S74, the processing for the interested element is ended.

In a case where such a set is found, the processor 102 specifies a document element having the related element name, in a document having the related document name (S80). In S80, a plurality of document elements satisfying the condition may be found. The processor 102 performs the processes of S82 to S86 for each document element (that is, the related element) specified in S80.

That is, the processor 102 acquires the attribute of the related element (S82). The processor 102 inputs a set of the related document name, the related element name, the phrase indicating a relation, and the attribute of document elements as the relation source and the relation destination, to the machine-learned AI 404a. In response to the input, the AI 404a outputs the type of relation corresponding to the set (S84). The processor 102 performs the association processing 406 to set the type of relation obtained from the AI 404a in S84, as the type of relation of the combination of the interested element and the related element, in the relation information on the database (S86).

As described above, in the modification example described with reference to FIGS. 19 and 20, the type of relation between document elements is determined in consideration of not only the information on the description representing the relation between the interested document element and another document element, but also the attributes of the two document elements. For this reason, the type of relation can be obtained with validity higher than validity in a case where the attributes of the document elements are not considered. For example, in the example of FIG. 19, the AI 404a that has learned in consideration of the storage location attributes of the document elements as the relation source and the relation destination is used. Thus, in a case where a plurality of related elements corresponding to the set of the related document name and the related element name are provided, the type of relation can be set to be stronger for the related element having a storage location which has a specific relation with the storage location of the interested element among the related elements, than for the related element having a storage location which does not have a specific relation with the interested element. For example, this is realized in a manner that the AI 404a is caused to learn a learning data group in which the related document name, the related element name, and the phrase representing the relation are identical, but the storage locations of the document elements as the relation source and the relation destination and the type of relation as teacher data are different. In the learning data group, the type of relation included in learning data in which the storage locations of document elements as the relation source and the relation destination have a specific relation shows a stronger relation than the type of relation included in learning data in which the storage locations do not have the specific relation. Examples of the specific relation in this case include a relation that "the storage locations of the relation source and the relation destination are in the identical document management system", and a relation that "the relation source is provided in the company rule management system 20, and the relation destination is provided in the law management system 60".

In the modification example of FIGS. 19 and 20, the attributes of both the two document elements are considered for determining the type of relation between the interested element and the related element, but this is just an example. As another example, for the determination, a method of considering the attribute of the interested element, but not considering the attribute of the related element, or a method of considering the attribute of the related element, but not considering the attribute of the interested element may be used.

Hitherto, the exemplary embodiment and the modification example of determining the type of relation between two document elements based on the description representing the relation to one document element in the other document element are described. The exemplary embodiment and the modification example are just examples.

In the above-described exemplary embodiment and the like, the processor 102 extracts the related document name, the relation source element name, and the phrase indicating the relation from the document element, and inputs the extracted data to the AI 404 or 404a. However, this is just an example. Alternatively, the processor 102 may input the description (for example, the description 512 in FIG. 17) itself representing the relation to another document element in the document element, to the AI 404 or 404a. The description includes the related document name, the relation source element name, and the phrase representing the relation. In the example, the AI 404 or 404a is caused to learn using multiple pieces of learning data including a description representing a relation to another document element and the type of relation corresponding to the description. The type of relation can be determined from the description representing the relation to another document element, by using the learned AI 404 or 404a.

In the above-described exemplary embodiment and the like, the element name of a document element as the relation destination and the document name of a document to which the document element as the relation destination belongs are extracted, as the information for specifying the document element as the relation destination, which is related to another document element, from this document element. However, this is also just an example. For example, in the document element, the information for specifying the document element as the relation destination may be included in a form other than the set of the document name and the element name, for example, in a form of a URL indicating the storage location of the related destination document element, an element ID, or the like. In this case, the processor 102 may extract the URL and the element ID as the information indicating the document element as the relation destination, instead of the related document name and the related element name.

In the exemplary embodiment described above, the document element is an element that forms a document. Here, there may be a document in a larger unit having individual documents managed by the document management system as constituent elements. In this case, the former individual document is a document element for the latter large unit document. For example, in a case where a hypertext configured with a plurality of documents linked by hyperlinks is regarded as a document of a large unit, the plurality of documents correspond to document elements in a case of being viewed from the hypertext.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to
extract a description including a phrase indicating a relation with a second document element from a first document element, and
generate relation information corresponding to information on the description extracted from the first document element, by an AI which has learned, in advance, by machine learning to generate the relation information indicating a relation between the first document element and the second document element from the information on the description.

2. The information processing apparatus according to claim 1,
wherein the AI has learned, in advance, by machine learning to generate the relation information from a combination of the information on the description and an attribute of the first document element or the second document element, and
the processor is configured to
acquire the attribute of the first document element, and
generate the relation information corresponding to the combination of the information on the description extracted from the first document element and the attribute of the first document element or the second document element, by using the AI.

3. The information processing apparatus according to claim 1,
wherein the AI has learned, in advance, by machine learning to generate the relation information from a combination of the information on the description, an attribute of the first document element, and an attribute of the second document element, and
the processor is configured to
acquire the attribute of the first document element and the attribute of the second document element, and
generate the relation information corresponding to the combination of the information on the description extracted from the first document element, the attribute of the first document element, and the attribute of the second document element, by using the AI.

4. The information processing apparatus according to claim 1,
wherein the AI has learned, in advance, by machine learning to generate the relation information from a combination of the phrase included in the description and specifying information for specifying the second document element, and
the processor is configured to
extract the phrase and the specifying information from the first document element, and
generate the relation information corresponding to a combination of the phrase and the specifying information, by using the AI.

5. The information processing apparatus according to claim 1,
wherein the processor is configured to
associate the first document element with the second document element different from the first document element by at least one type of relation among a plurality of types of relations, and
perform processing corresponding to the type of relation between the first document element and the second document element, on the second document element in a case where the first document element is changed.

6. The information processing apparatus according to claim 2,
wherein the processor is configured to
associate the first document element with the second document element different from the first document element by at least one type of relation among a plurality of types of relations, and
perform processing corresponding to the type of relation between the first document element and the second document element, on the second document element in a case where the first document element is changed.

7. The information processing apparatus according to claim 3,
wherein the processor is configured to
associate the first document element with the second document element different from the first document element by at least one type of relation among a plurality of types of relations, and
perform processing corresponding to the type of relation between the first document element and the second document element, on the second document element in a case where the first document element is changed.

8. The information processing apparatus according to claim 4,
wherein the processor is configured to
associate the first document element with the second document element different from the first document element by at least one type of relation among a plurality of types of relations, and
perform processing corresponding to the type of relation between the first document element and the second document element, on the second document element in a case where the first document element is changed.

9. The information processing apparatus according to claim 5,
wherein, in a case where the relation between the first document element and the second document element is a first type of relation in which a similarity between the first document element and the second document element is equal to or greater than a first predetermined threshold value which is greater than 0, the processing is notification processing of notifying a participant of the second document element that the first document element is changed.

10. The information processing apparatus according to claim 6,
wherein, in a case where the relation between the first document element and the second document element is a first type of relation in which a similarity between the first document element and the second document element is equal to or greater than a first predetermined threshold value which is greater than 0, the processing is notification processing of notifying a participant of the second document element that the first document element is changed.

11. The information processing apparatus according to claim 7,
wherein, in a case where the relation between the first document element and the second document element is a first type of relation in which a similarity between the first document element and the second document element is equal to or greater than a first predetermined threshold value which is greater than 0, the processing is notification processing of notifying a participant of the second document element that the first document element is changed.

12. The information processing apparatus according to claim 8,
wherein, in a case where the relation between the first document element and the second document element is a first type of relation in which a similarity between the first document element and the second document element is equal to or greater than a first predetermined threshold value which is greater than 0, the processing is notification processing of notifying a participant of the second document element that the first document element is changed.

13. The information processing apparatus according to claim 5,
wherein, in a case where the relation between the first document element and the second document element is a second type of relation, the processing is processing of copying the changed first document element to the second document element, and
the second type of relation is a relation in which a similarity between the first document element and the second document element is equal to or greater than a second threshold value being a minimum value of the similarity, by which the first document element and the second document element are considered to be identical to each other.

14. The information processing apparatus according to claim 6,
wherein, in a case where the relation between the first document element and the second document element is a second type of relation, the processing is processing of copying the changed first document element to the second document element, and
the second type of relation is a relation in which a similarity between the first document element and the second document element is equal to or greater than a second threshold value being a minimum value of the similarity, by which the first document element and the second document element are considered to be identical to each other.

15. The information processing apparatus according to claim 7,
    wherein, in a case where the relation between the first document element and the second document element is a second type of relation, the processing is processing of copying the changed first document element to the second document element, and
    the second type of relation is a relation in which a similarity between the first document element and the second document element is equal to or greater than a second threshold value being a minimum value of the similarity, by which the first document element and the second document element are considered to be identical to each other.

16. The information processing apparatus according to claim 8,
    wherein, in a case where the relation between the first document element and the second document element is a second type of relation, the processing is processing of copying the changed first document element to the second document element, and
    the second type of relation is a relation in which a similarity between the first document element and the second document element is equal to or greater than a second threshold value being a minimum value of the similarity, by which the first document element and the second document element are considered to be identical to each other.

17. The information processing apparatus according to claim 5,
    wherein the processing is processing in which, on a display screen showing a relation between the changed first document element and one or more second document elements associated with the first document element, each of the one or more second document elements is displayed in a display mode corresponding to the type of the relation between the second document element and the first document element.

18. The information processing apparatus according to claim 6,
    wherein the processing is processing in which, on a display screen showing a relation between the changed first document element and one or more second document elements associated with the first document element, each of the one or more second document elements is displayed in a display mode corresponding to the type of the relation between the second document element and the first document element.

19. The information processing apparatus according to claim 7,
    wherein the processing is processing in which, on a display screen showing a relation between the changed first document element and one or more second document elements associated with the first document element, each of the one or more second document elements is displayed in a display mode corresponding to the type of the relation between the second document element and the first document element.

20. A non-transitory computer readable medium storing a program causing a computer to perform
    extracting a description including a phrase indicating a relation with a second document element from a first document element; and
    generating relation information corresponding to information on the description extracted from the first document element, by an AI which has learned, in advance, by machine learning to generate the relation information indicating a relation between the first document element and the second document element from the information on the description.

* * * * *